United States Patent
Yan et al.

(10) Patent No.: US 12,006,422 B2
(45) Date of Patent: Jun. 11, 2024

(54) COUPLED POLYMER PRODUCTS, METHODS OF MAKING AND COMPOSITIONS CONTAINING

(71) Applicant: Bridgestone Corporation, Chuo-ku (JP)

(72) Inventors: Yuan-Yong Yan, Copley, OH (US); Rita E. Cook, Akron, OH (US); Christine M. Rademacher, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 522 days.

(21) Appl. No.: 16/772,797

(22) PCT Filed: Dec. 13, 2018

(86) PCT No.: PCT/US2018/065362
§ 371 (c)(1),
(2) Date: Jun. 14, 2020

(87) PCT Pub. No.: WO2019/118678
PCT Pub. Date: Jun. 20, 2019

(65) Prior Publication Data
US 2021/0163720 A1    Jun. 3, 2021

Related U.S. Application Data

(60) Provisional application No. 62/598,726, filed on Dec. 14, 2017.

(51) Int. Cl.
| | | |
|---|---|---|
| *C08L 21/00* | (2006.01) | |
| *B60C 1/00* | (2006.01) | |
| *C08F 236/06* | (2006.01) | |
| *C08K 3/04* | (2006.01) | |
| *C08K 3/36* | (2006.01) | |
| *C08K 5/1539* | (2006.01) | |
| *C08K 5/5419* | (2006.01) | |
| *C08K 5/5425* | (2006.01) | |
| *C08K 5/5435* | (2006.01) | |
| *C08K 5/544* | (2006.01) | |
| *C08K 5/5445* | (2006.01) | |
| *C08K 5/5475* | (2006.01) | |
| *C08L 9/06* | (2006.01) | |

(52) U.S. Cl.
CPC ............. *C08L 21/00* (2013.01); *B60C 1/0016* (2013.01); *C08F 236/06* (2013.01); *C08K 3/04* (2013.01); *C08K 3/36* (2013.01); *C08K 5/1539* (2013.01); *C08K 5/5419* (2013.01); *C08K 5/5425* (2013.01); *C08K 5/5435* (2013.01); *C08K 5/5445* (2021.01); *C08K 5/5475* (2013.01); *C08K 5/5477* (2021.01); *C08L 9/06* (2013.01); *C08F 2438/00* (2013.01); *C08F 2810/40* (2013.01); *C08L 2205/02* (2013.01)

(58) Field of Classification Search
CPC .............. C08F 236/06; C08F 2438/00; C08F 2810/40; C08K 3/04; C08K 3/36; C08K 5/1539; C08K 5/5419; C08K 5/5425; C08K 5/5435; C08K 5/5445; C08K 5/5475; C08K 5/5477; C08L 9/06; C08L 2205/02
See application file for complete search history.

(56) References Cited

U.S. PATENT DOCUMENTS

| | | |
|---|---|---|
| 5,378,777 A | 1/1995 | Watanabe et al. |
| 6,448,353 B1 | 9/2002 | Nelson et al. |
| 6,995,224 B2 | 2/2006 | Halasa et al. |
| 8,815,977 B2 | 8/2014 | Ito et al. |
| 8,946,347 B2 | 2/2015 | Fujii |
| 8,987,371 B2 | 3/2015 | Corono Galvan et al. |
| 9,085,652 B2 | 7/2015 | Tajima |
| 9,120,890 B2 | 9/2015 | Ishino et al. |
| 9,156,969 B2 | 10/2015 | Fujii |
| 9,238,765 B2 | 1/2016 | Corona Galvan et al. |
| 9,550,840 B2 | 1/2017 | Nakamura et al. |
| 2006/0074197 A1* | 4/2006 | Hogan .................. C08F 8/34 525/333.3 |
| 2008/0015309 A1 | 1/2008 | Ozawa et al. |

(Continued)

FOREIGN PATENT DOCUMENTS

| | | |
|---|---|---|
| JP | 2003-155302 A | 5/2003 |
| JP | 2005-232364 A | 9/2005 |

(Continued)

OTHER PUBLICATIONS

Supplementary European search report and opinion from EP application No. 18888963, dated Sep. 15, 2021.
Written opinion from PCT application No. PCT/US2018/065362, dated Apr. 19, 20219.
International search report from PCT application No. PCT/US2018/065362, dated Apr. 19, 2019.
Hirao, et al., "Polymerization of Monomers Containing Functional Silyl Groups. Anionic Living Polymerization of (4-vinylphenyl)dimethylsilane," Macromolecules, vol. 20(7), pp. 1505-1509 (1987).

(Continued)

*Primary Examiner* — Doris L Lee
(74) *Attorney, Agent, or Firm* — Meredith E. Hooker; Jenny L. Sheaffer

(57) ABSTRACT

Disclosed herein are coupled polymer products comprising polymer with up to five polymer chains bonded to a functionalizing compound of either formula (II) or formula (III), wherein the polymer chains are comprised of conjugated diene-containing monomers optionally in combination with vinyl aromatic monomers and further include vinyl group-functionalized aminosilane compound of formula (I) bonded within the polymer chain. Also disclosed are processes for producing the coupled polymer products as well as a rubber composition containing the coupled polymer product and tire components comprising the rubber composition.

25 Claims, No Drawings

(56) References Cited

U.S. PATENT DOCUMENTS

| | | |
|---|---|---|
| 2013/0338296 A1 | 12/2013 | Mabuchi et al. |
| 2013/0345335 A1 | 12/2013 | Shibata et al. |
| 2015/0011698 A1 | 1/2015 | Fujii |
| 2015/0175854 A1 | 6/2015 | Corna Galvan et al. |
| 2015/0329716 A1 | 11/2015 | Kojima et al. |
| 2016/0152756 A1 | 6/2016 | Lawson et al. |
| 2016/0160015 A1* | 6/2016 | Dire ................ C08C 19/44 523/156 |
| 2016/0264772 A1 | 9/2016 | Nishioka et al. |
| 2017/0247532 A1 | 8/2017 | Miller |
| 2020/0031979 A1 | 1/2020 | Yan et al. |

FOREIGN PATENT DOCUMENTS

| | | |
|---|---|---|
| JP | 2006-257262 A | 9/2006 |
| JP | 2011-074310 A | 4/2011 |
| JP | 2011-219701 A | 11/2011 |
| JP | 2012-167207 A | 9/2012 |
| JP | 2013-159770 A | 8/2013 |
| JP | 2013-163761 A | 8/2013 |
| JP | 2013-249418 A | 12/2013 |
| JP | 2015-054862 A | 3/2015 |
| JP | 2020-510111 A | 4/2020 |
| WO | 2015-046392 A1 | 4/2015 |
| WO | 2015-152039 A1 | 10/2015 |
| WO | 2016-008507 A1 | 1/2016 |
| WO | 2016-162473 A1 | 10/2016 |
| WO | 2018-165387 A1 | 9/2018 |

OTHER PUBLICATIONS

Hirao, et al., "Polymerization of Monomers Containing Functional Silyl Groups. Anionic Living Polymerization of (N, N-dialkylaminodimethylsilyl-butadiene," Macromolecules, vol. 31(2), pp. 281-287 (1988).

* cited by examiner

COUPLED POLYMER PRODUCTS, METHODS OF MAKING AND COMPOSITIONS CONTAINING

This application is a national stage application of PCT/US2018/065362 filed on Dec. 13, 2018, which claims the benefit of U.S. Provisional Application Ser. No. 62/598,726 filed on Dec. 14, 2017, which are incorporated herein by reference in their entirety.

FIELD

The present application is directed to a coupled polymer product containing functionalized polymers, to methods of making the coupled polymer product, and to rubber compositions containing the coupled polymer product. The present disclosure also relates to tires having at least one component (e.g., a tread) containing the coupled polymer product or a rubber composition thereof.

BACKGROUND

Rubber compositions for vehicles tires may utilize use rubber compositions containing functionalized and/or coupled polymers.

SUMMARY

Disclosed herein are a coupled polymer product containing functionalized polymers, methods of making the coupled polymer product, and rubber compositions containing the coupled polymer product. Also disclosed herein are tires having at least one component (e.g., a tread) containing the coupled polymer product or a rubber composition thereof.

In a first embodiment, a process for preparing a coupled polymer product is disclosed. The process comprises: (a) polymerizing at least one conjugated diene monomer and optionally at least one vinyl aromatic monomer using an anionic initiator to produce polymer chains with a living end; (b) reacting the living end polymer chains from (a) with a vinyl group-functionalized aminosilane compound having formula (I): $(H_2C=CH_2)$-(A)-$Si(R^1)(R^2)(R^3)$, wherein A is divalent and selected from $C_6$-$C_{20}$ aromatic hydrocarbons optionally substituted with an aliphatic alkylene moiety to which the Si is bonded, each of $R^1$, $R^2$, and $R^3$ are independently selected from linear or branched $C_1$-$C_{12}$ hydrocarbyl and —$N(R^4)(R^5)$, with at least one of $R^1$, $R^2$ and $R^3$ selected from —$N(R^4)(R^5)$, wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring, and $R^1$ and $R^2$ are optionally bonded together into a ring comprising two nitrogen atoms, thereby producing a first intermediary product including polymer chains containing at least one vinyl group-functionalized aminosilane compound bonded to the polymer chain via its vinyl group; (c) continuing polymerization of the at least one conjugated diene monomer and at least one vinyl aromatic monomer when present from (a) upon the polymer chains from (b), thereby producing a second intermediary product including polymer chains containing at least one vinyl group-functionalized aminosilane compound of formula (I) bonded within the polymer chain via its vinyl group, wherein the average number of vinyl group-functionalized aminosilane compound of formula (I) per polymer chain is about 0.1:1 to about 3:1; and (d) functionalizing the second intermediary product from (c) with a functionalizing compound having formula (II): NC-$(Q^1)Si(X^1)(X^2)(X^3)$, (wherein $Q^1$ is divalent and selected from $C_1$-$C_{12}$ alkylene moieties or aromatic moieties, each X is a leaving group independently selected from halogens and alkoxy of $OR^6$ wherein each $R^6$ is independently selected from $C_1$-$C_{12}$ aliphatic hydrocarbyl, thereby producing a final polymer product including (i) polymer chain ends functionalized with a compound of formula (II) via its NC— group, (ii) polymer chain ends functionalized with a compound of formula (II) via the Si of formula (II), (iii) up to 3 polymer chains bonded to the Si of each compound of formula (II) from (i), (iv) the polymer chains of the final polymer product of (d) have an average number of vinyl group-functionalized aminosilane compound of formula (I) per polymer chain of about 0.1:1 to about 3:1, and (v) 20 to 90% by weight of the polymer product comprises coupled polymer with 2 or more chains bonded directly to each functionalized compound of formula (II).

In a second embodiment, a coupled polymer product is disclosed. The coupled polymer product comprises polymer with up to a total of five polymer chains bonded directly to a functionalizing compound of formula II, wherein formula (II) is as follows: NC-$(Q^1)Si(X^1)(X^2)(X^3)$, wherein $Q^1$ is divalent and selected from $C_1$-$C_{12}$ alkylene moieties or aromatic moieties, each X is a leaving group independently selected from halogens and alkoxy of $OR^6$ wherein each $R^6$ is independently selected from $C_1$-$C_{12}$ aliphatic hydrocarbyl, wherein the polymer chains comprise (a) at least one conjugated diene monomer optionally in combination with at least one vinyl aromatic monomer, and (b) at least one vinyl group-functionalized aminosilane compound of formula (I) bonded within the polymer chain via its vinyl group, wherein formula (I) is as follows: $(H_2C=CH_2)$-(A)-$Si(R^1)(R^2)(R^3)$, wherein A is divalent and selected from $C_6$-$C_{20}$ aromatic hydrocarbons optionally substituted with an aliphatic alkylene moiety to which the Si is bonded, each of $R^1$, $R^2$, and $R^3$ are independently selected from linear or branched $C_1$-$C_{12}$ hydrocarbyl and —$N(R^4)(R^5)$, with at least one of $R^1$, $R^2$ and $R^3$ selected from —$N(R^4)(R^5)$, wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring, and $R^1$ and $R^2$ are optionally bonded together into a ring comprising two nitrogen atoms. In the coupled polymer product, the average number of vinyl group-functionalized aminosilane compound of formula (I) per polymer chain is about 0.1:1 to about 3:1, and up to 3 polymer chains are bonded to the Si of each compound of formula (II).

In a third embodiment, a process for preparing a coupled polymer product is disclosed. The process comprises: (a) polymerizing at least one conjugated diene monomer and optionally at least one vinyl aromatic monomer using an anionic initiator to produce polymer chains with a living end; (b) reacting the living end polymer chains from (a) with a vinyl group-functionalized aminosilane compound having formula (I): $(H_2C=CH_2)$-(A)-$Si(R^1)(R^2)(R^3)$, wherein A is divalent and selected from $C_6$-$C_{20}$ aromatic hydrocarbons optionally substituted with an aliphatic alkylene moiety to which the Si is bonded, each of $R^1$, $R^2$, and $R^3$ are independently selected from linear or branched $C_1$-$C_{12}$ hydrocarbyl and —$N(R^4)(R^5)$, with at least one of $R^1$, $R^2$ and $R^3$ selected from —$N(R^4)(R^5)$, wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring, and $R^1$ and $R^2$ are optionally bonded together into a ring comprising two nitrogen atoms, thereby producing a first intermediary product including polymer chains containing at least one vinyl group-functionalized aminosilane compound bonded to the polymer chain via its vinyl group; (c) continuing polymerization of the at least one conjugated diene monomer and at least one vinyl aromatic monomer when present from (a) upon the polymer chains from (b), thereby producing a second intermediary product including polymer chains containing at least one vinyl group-functionalized aminosilane compound of formula (I) bonded within the polymer chain via its vinyl group, wherein the average number of vinyl group-functionalized aminosilane compound of formula (I) per polymer chain is about 0.1:1 to about 3:1; and (d) functionalizing the second intermediary product from (c) with a functionalizing compound having formula (III): acid anhydride-$(Q^2)(Q^3)$Si$(X^4)(X^5)(X^6)$, wherein $Q^2$ comprises at least two methylene groups bonded together and forming a cyclic acid anhydride for formula (III), wherein $Q^3$ is divalent and selected from $C_1$-$C_{12}$ alkylene moieties or aromatic moieties, each X is a leaving group independently selected from halogens and alkoxy of $OR^7$ wherein each $R^7$ is independently selected from $C_1$-$C_{12}$ aliphatic hydrocarbyl, thereby producing a final polymer product including: (i) polymer chain ends functionalized with a compound of formula (III) via its acid anhydride group, (ii) polymer chain ends functionalized with a compound of formula (III) via the Si of formula (III), (iii) up to 3 polymer chains bonded to the Si of each compound of formula (III) from (i), (iv) the polymer chains of the final polymer product of (d) have an average number of vinyl group-functionalized aminosilane compound of formula (I) per polymer chain of about 0.1:1 to about 3:1, and (v) 20 to 80% by weight of the polymer product comprises coupled polymer with 2 or more polymer chains bonded directly to each functionalized compound of formula (III).

In a fourth embodiment, a coupled polymer product is disclosed. The coupled polymer product comprises polymer with up to a total of 5 polymer chains bonded directly to a functionalizing compound of formula (III), wherein formula (III) is as follows: acid anhydride-$(Q^2)(Q^3)$Si$(X^4)(X^5)(X^6)$, wherein $Q^2$ comprises at least two methylene groups bonded together and forming a cyclic acid anhydride for formula (III), wherein $Q^3$ is divalent and selected from $C_1$-$C_{12}$ alkylene moieties or aromatic moieties, each X is a leaving group independently selected from halogens and alkoxy of $OR^7$ wherein each $R^7$ is independently selected from $C_1$-$C_{12}$ aliphatic hydrocarbyl, wherein the polymer chains comprise (a) at least one conjugated diene monomer optionally in combination with at least one vinyl aromatic monomer, and (b) at least one vinyl group-functionalized aminosilane compound of formula (I) bonded within the polymer chain via its vinyl group, wherein formula (I) is as follows: $(H_2C=CH_2)$-(A)-Si$(R^1)(R^2)(R^3)$, wherein A is divalent and selected from $C_6$-$C_{20}$ aromatic hydrocarbons optionally substituted with an aliphatic alkylene moiety to which the Si is bonded, each of $R^1$, $R^2$, and $R^3$ are independently selected from linear or branched $C_1$-$C_{12}$ hydrocarbyl and —N$(R^4)(R^5)$, with at least one of $R^1$, $R^2$ and $R^3$ selected from —N$(R^4)(R^5)$, and wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring, and $R^1$ and $R^2$ are optionally bonded together into a ring comprising two nitrogen atoms. In the coupled polymer product, the average number of vinyl group-functionalized aminosilane compound of formula (I) per polymer chain is about 0.1:1 to about 3:1, and up to 3 polymer chains are bonded to the Si of each compound of formula (III).

In a fifth embodiment, a rubber composition comprising the coupled polymer product of the second embodiment or the coupled polymer product resulting from the process of the first embodiment is disclosed. The rubber composition comprises: (a) 10-100 parts of the coupled polymer product; (b) 0-90 parts of at least one diene monomer-containing polymer, preferably selected from the group consisting of natural rubber, polyisoprene, polybutadiene rubber, styrene-butadiene rubber, styrene-butadiene-isoprene rubber, isoprene-butadiene rubber, and combinations thereof; and (c) 5-200 phr of at least one reinforcing filler selected from carbon black, silica, and combinations thereof.

In a sixth embodiment, a rubber composition comprising the coupled polymer product of the fourth embodiment or the coupled polymer product resulting from the process of the third embodiment is disclosed. The rubber composition comprises: (a) 10-100 parts of the coupled polymer product; (b) 0-90 parts of at least one diene monomer-containing polymer, preferably selected from the group consisting of natural rubber, polyisoprene, polybutadiene rubber, styrene-butadiene rubber, styrene-butadiene-isoprene rubber, isoprene-butadiene rubber, and combinations thereof; and (c) 5-200 phr of at least one reinforcing filler selected from carbon black, silica, and combinations thereof.

DETAILED DESCRIPTION

In a first embodiment, a process for preparing a coupled polymer product is disclosed. The process comprises: (a) polymerizing at least one conjugated diene monomer and optionally at least one vinyl aromatic monomer using an anionic initiator to produce polymer chains with a living end; (b) reacting the living end polymer chains from (a) with a vinyl group-functionalized aminosilane compound having formula (I): $(H_2C=CH_2)$-(A)-Si$(R^1)(R^2)(R^3)$, wherein A is divalent and selected from $C_6$-$C_{20}$ aromatic hydrocarbons optionally substituted with an aliphatic alkylene moiety to which the Si is bonded, each of $R^1$, $R^2$, and $R^3$ are independently selected from linear or branched $C_1$-$C_{12}$ hydrocarbyl and —N$(R^4)(R^5)$, with at least one of $R^1$, $R^2$ and $R^3$ selected from —N$(R^4)(R^5)$, wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring, and $R^1$ and $R^2$ are optionally bonded together into a ring comprising two nitrogen atoms, thereby producing a first intermediary product including polymer chains containing at least one vinyl group-functionalized aminosilane compound bonded to the polymer chain via its vinyl group; (c) continuing polymerization of the at least one conjugated diene monomer and at least one vinyl aromatic monomer when present from (a) upon the polymer chains from (b), thereby producing a second intermediary product including polymer chains containing at least one vinyl group-functionalized aminosilane compound of formula (I) bonded within the polymer chain via its vinyl group, wherein the average number of vinyl group-functionalized aminosilane compound of formula (I) per polymer chain is about 0.1:1 to about 3:1; and (d) functionalizing the second intermediary product from (c) with a functionalizing compound having formula (II): NC-$(Q^1)$Si$(X^1)(X^2)(X^3)$, (wherein $Q^1$ is divalent and selected from $C_1$-$C_{12}$ alkylene moieties or aromatic moieties, each X is a leaving group independently selected from halogens and alkoxy of $OR^6$ wherein each $R^6$ is independently selected from $C_1$-$C_{12}$ aliphatic hydrocarbyl, thereby producing a final polymer product including (i) polymer chain ends functionalized with a compound of formula (II) via its NC— group, (ii) polymer chain ends functionalized with a compound of formula (II) via the Si of formula (II), (iii) up to 3 polymer chains bonded to the Si of each compound of formula (II) from (i), (iv) the polymer chains of the final polymer product of (d) have an average number of vinyl group-functionalized aminosilane compound of formula (I) per polymer chain of about 0.1:1 to about 3:1, and (v) 20 to 90% by weight of the polymer product comprises coupled polymer with 2 or more chains bonded directly to each functionalized compound of formula (II).

In a second embodiment, a coupled polymer product is disclosed. The coupled polymer product comprises polymer with up to a total of five polymer chains bonded directly to a functionalizing compound of formula II, wherein formula (II) is as follows: $NC-(Q^1)Si(X^1)(X^2)(X^3)$, wherein $Q^1$ is divalent and selected from $C_1$-$C_{12}$ alkylene moieties or aromatic moieties, each X is a leaving group independently selected from halogens and alkoxy of $OR^6$ wherein each $R^6$ is independently selected from $C_1$-$C_{12}$ aliphatic hydrocarbyl, wherein the polymer chains comprise (a) at least one conjugated diene monomer optionally in combination with at least one vinyl aromatic monomer, and (b) at least one vinyl group-functionalized aminosilane compound of formula (I) bonded within the polymer chain via its vinyl group, wherein formula (I) is as follows: $(H_2C=CH_2)$-$(A)$-$Si(R^1)(R^2)(R^3)$, wherein A is divalent and selected from $C_6$-$C_{20}$ aromatic hydrocarbons optionally substituted with an aliphatic alkylene moiety to which the Si is bonded, each of $R^1$, $R^2$, and $R^3$ are independently selected from linear or branched $C_1$-$C_{12}$ hydrocarbyl and $-N(R^4)(R^5)$, with at least one of $R^1$, $R^2$ and $R^3$ selected from $-N(R^4)(R^5)$, wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring, and $R^1$ and $R^2$ are optionally bonded together into a ring comprising two nitrogen atoms. In the coupled polymer product, the average number of vinyl group-functionalized aminosilane compound of formula (I) per polymer chain is about 0.1:1 to about 3:1, and up to 3 polymer chains are bonded to the Si of each compound of formula (II).

In a third embodiment, a process for preparing a coupled polymer product is disclosed. The process comprises: (a) polymerizing at least one conjugated diene monomer and optionally at least one vinyl aromatic monomer using an anionic initiator to produce polymer chains with a living end; (b) reacting the living end polymer chains from (a) with a vinyl group-functionalized aminosilane compound having formula (I): $(H_2C=CH_2)$-$(A)$-$Si(R^1)(R^2)(R^3)$, wherein A is divalent and selected from $C_6$-$C_{20}$ aromatic hydrocarbons optionally substituted with an aliphatic alkylene moiety to which the Si is bonded, each of $R^1$, $R^2$, and $R^3$ are independently selected from linear or branched $C_1$-$C_{12}$ hydrocarbyl and $-N(R^4)(R^5)$, with at least one of $R^1$, $R^2$ and $R^3$ selected from $-N(R^4)(R^5)$, wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring, and $R^1$ and $R^2$ are optionally bonded together into a ring comprising two nitrogen atoms, thereby producing a first intermediary product including polymer chains containing at least one vinyl group-functionalized aminosilane compound bonded to the polymer chain via its vinyl group; (c) continuing polymerization of the at least one conjugated diene monomer and at least one vinyl aromatic monomer when present from (a) upon the polymer chains from (b), thereby producing a second intermediary product including polymer chains containing at least one vinyl group-functionalized aminosilane compound of formula (I) bonded within the polymer chain via its vinyl group, wherein the average number of vinyl group-functionalized aminosilane compound of formula (I) per polymer chain is about 0.1:1 to about 3:1; and (d) functionalizing the second intermediary product from (c) with a functionalizing compound having formula (III): acid anhydride-$(Q^2)(Q^3)Si(X^4)(X^5)(X^6)$, wherein $Q^2$ comprises at least two methylene groups bonded together and forming a cyclic acid anhydride for formula (III), wherein $Q^3$ is divalent and selected from $C_1$-$C_{12}$ alkylene moieties or aromatic moieties, each X is a leaving group independently selected from halogens and alkoxy of $OR^7$ wherein each $R^7$ is independently selected from $C_1$-$C_{12}$ aliphatic hydrocarbyl, thereby producing a final polymer product including: (i) polymer chain ends functionalized with a compound of formula (III) via its acid anhydride group, (ii) polymer chain ends functionalized with a compound of formula (III) via the Si of formula (III), (iii) up to 3 polymer chains bonded to the Si of each compound of formula (III) from (i), (iv) the polymer chains of the final polymer product of (d) have an average number of vinyl group-functionalized aminosilane compound of formula (I) per polymer chain of about 0.1:1 to about 3:1, and (v) 20 to 80% by weight of the polymer product comprises coupled polymer with 2 or more polymer chains bonded directly to each functionalized compound of formula (III).

In a fourth embodiment, a coupled polymer product is disclosed. The coupled polymer product comprises polymer with up to a total of 5 polymer chains bonded directly to a functionalizing compound of formula (III), wherein formula (III) is as follows: acid anhydride-$(Q^2)(Q^3)Si(X^4)(X^5)(X^6)$, wherein $Q^2$ comprises at least two methylene groups bonded together and forming a cyclic acid anhydride for formula (III), wherein $Q^3$ is divalent and selected from $C_1$-$C_{12}$ alkylene moieties or aromatic moieties, each X is a leaving group independently selected from halogens and alkoxy of $OR^7$ wherein each $R^7$ is independently selected from $C_1$-$C_{12}$ aliphatic hydrocarbyl, wherein the polymer chains comprise (a) at least one conjugated diene monomer optionally in combination with at least one vinyl aromatic monomer, and (b) at least one vinyl group-functionalized aminosilane compound of formula (I) bonded within the polymer chain via its vinyl group, wherein formula (I) is as follows: $(H_2C=CH_2)$-$(A)$-$Si(R^1)(R^2)(R^3)$, wherein A is divalent and selected from $C_6$-$C_{20}$ aromatic hydrocarbons optionally substituted with an aliphatic alkylene moiety to which the Si is bonded, each of $R^1$, $R^2$, and $R^3$ are independently selected from linear or branched $C_1$-$C_{12}$ hydrocarbyl and $-N(R^4)(R^5)$, with at least one of $R^1$, $R^2$ and $R^3$ selected from $-N(R^4)(R^5)$, and wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring, and $R^1$ and $R^2$ are optionally bonded together into a ring comprising two nitrogen atoms. In the coupled polymer product, the average number of vinyl group-functionalized aminosilane compound of formula (I) per polymer chain is about 0.1:1 to about 3:1, and up to 3 polymer chains are bonded to the Si of each compound of formula (III).

In a fifth embodiment, a rubber composition comprising the coupled polymer product of the second embodiment or the coupled polymer product resulting from the process of the first embodiment is disclosed. The rubber composition comprises: (a) 10-100 parts of the coupled polymer product; (b) 0-90 parts of at least one diene monomer-containing polymer, preferably selected from the group consisting of natural rubber, polyisoprene, polybutadiene rubber, styrene-butadiene rubber, styrene-butadiene-isoprene rubber, isoprene-butadiene rubber, and combinations thereof; and (c)

5-200 phr of at least one reinforcing filler selected from carbon black, silica, and combinations thereof.

In a sixth embodiment, a rubber composition comprising the coupled polymer product of the fourth embodiment or the coupled polymer product resulting from the process of the third embodiment is disclosed. The rubber composition comprises: (a) 10-100 parts of the coupled polymer product; (b) 0-90 parts of at least one diene monomer-containing polymer, preferably selected from the group consisting of natural rubber, polyisoprene, polybutadiene rubber, styrene-butadiene rubber, styrene-butadiene-isoprene rubber, isoprene-butadiene rubber, and combinations thereof; and (c) 5-200 phr of at least one reinforcing filler selected from carbon black, silica, and combinations thereof.

Definitions

The terminology as set forth herein is for description of the embodiments only and should not be construed as limiting the invention as a whole.

As used herein, the term "alkylene" refers to a divalent aliphatic moiety derived from an alkene by opening of the double bond or from an alkane by removal of two hydrogen atoms. Non-limiting examples include —$CH_2$— (methylene) and —$CH_2$—$CH_2$— (ethylene).

As used herein, the term "head" of a polymer is used to refer to the chain end where initiator residue resides, whereas the term "end" or "tail" is used to refer to the chain end nearest the location where the final monomer unit has been added to the polymer.

As used herein, the term hydrocarbyl refers to a univalent radical derived from a hydrocarbon.

As used herein, the abbreviation Mn is used for number average molecular weight.

As used herein, the abbreviation Mp is used for peak molecular weight.

As used herein, the abbreviation Mw is used for weight average molecular weight.

Unless otherwise indicated herein, the term "Mooney viscosity" refers to the Mooney viscosity, $ML_{1+4}$. As those of skill in the art will understand, a rubber composition's Mooney viscosity is measured prior to vulcanization or curing.

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, the term "phr" means parts per one hundred parts rubber.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

Coupled Polymer Product and Monomers

Coupled Polymer Product

As discussed above, the first and third embodiments disclosed herein are directed to a process of preparing a coupled polymer product, and the second and fourth embodiments are directed to a coupled polymer product. By the phrase coupled polymer product is meant that the polymers within the coupled polymer product represent a mixture of polymers having differing numbers of polymer chains bonded to a functionalizing compound of either formula (II) (second embodiment) or formula (III) (fourth embodiment). The coupling or bonding of multiple polymer chains to a functionalizing compound of formula (II) or formula (III) results in multi-arm polymers which may be referred to as star polymers. Since more than one polymer chain can bond to the functionalizing compound, the bonding may be referred to as coupling and the polymer chains as "coupled" to the functionalizing compound of formula (II) or formula (III) when two or more polymer chains are bonded thereto. More specifically, according to the first embodiment and in certain embodiments of the second embodiment, 20 to 90% by weight (e.g., 20, 25, 30, 35, 40, 45, 50, 55, 60, 65, 70, 75, 80, 85, or 90% by weight), preferably 50 to 90% by weight (e.g., 50, 55, 60, 65, 70, 75, 80, 85 or 90% by weight) of the coupled polymer product comprises polymers with 2 or more polymer chains bonded to the functionalizing compound of formula (II); the remaining amount of the coupled polymer product (i.e., 10 to 80% by weight, preferably 10 to 40% by weight) can be understood to correspond to uncoupled polymer product (which as discussed below has only one polymer chain bonded to the functionalizing compound of formula (II)). According to the third embodiment and in certain embodiments of the fourth embodiments, 20 to 80% by weight (e.g., 20, 25, 30, 35, 40, 45, 50, 55, 60, 65, 70, 75, or 80% by weight), preferably 50 to 70% by weight (e.g., 50, 55, 60, 65, or 70% by weight) of the coupled polymer product comprises polymers with 2 or more polymer chains bonded to the functionalizing compound of formula (III); the remaining amount of the coupled polymer product (i.e., 20 to 80% by weight, preferably 30 to 50% by weight) can be understood to correspond to uncoupled polymer product (which as discussed below has only one polymer chain bonded to the functionalizing compound of formula (III)). A chain not bonded to the functionalizing compound of either formula (II) or formula (III) can be referred to as an un-functionalized polymer (although such a polymer may still contain vinyl group-functionalized aminosilane compound bonded within the polymer chain). A polymer having only 1 polymer chain bonded to the functionalizing compound of formula (II) or formula (III) can be referred to as an uncoupled functionalized polymer (such a polymer may also contain vinyl group-functionalized aminosilane compound bonded within the polymer chain), since coupling in such description is used to refer to the bonding of at least two polymer chains. The amount (by weight) of coupled polymer product which comprises polymers having 1 to 2 polymer chains bonded to the functionalizing compound of formula (II) or (III) can be measured by GPC, whereby the portion of the product having 3 to 4 chains will be represented by a relatively large peak eluting before a relatively smaller peak (the smaller peak representing polymers with either 1 or 2 polymer chains bonded to the functionalizing compound of formula (II) or (III)).

As discussed above, the polymer chains which are present in the coupled polymer product of the first-fourth embodiments, are comprised of at least one conjugated diene-containing monomer optionally in combination with at least one vinyl aromatic monomer. Furthermore, the polymer chains also include at least one vinyl group-functionalized aminosilane compound of formula (I) bonded within the polymer chain via its vinyl group. By stating that the vinyl group-functionalized aminosilane compound of formula (I) is bonded within the polymer chain via its vinyl group is meant that the compound becomes bonded within the polymer chain (i.e., via its vinyl group with the alpha and beta carbons of the vinyl group becoming incorporated into the polymer chain). According to the first-fourth embodiments, the vinyl group-functionalized aminosilane compound of formula (I) is not positioned at the head of the polymer (since it is not added as a functionalized initiator), but instead appears more than 1 mer away from the head of the polymer chain (e.g., $2^{nd}$ mer, $3^{rd}$ mer, . . . $100^{th}$ mer, . . . $1000^{th}$ mer, etc.). In certain embodiments of the first-fourth embodiments, the vinyl group-functionalized aminosilane compound of formula (I) is positioned within the chain by at least 1% of the polymer mers from the head of the polymer chain (e.g., at least 1%, 1%, at least 5%, 5%, at least 10%, 10%, at least 20%, 20%, at least 30%, 30%, at least 40%, 40%, at least 50%, or 50%) and up to 99% of the polymer mers from the head (e.g., up to 51%, up to 55%, up to 60%, up to 70%, up to 80%, up to 90%, up to 95%, up to 99%). In other embodiments, the vinyl group-functionalized aminosilane compound of formula (I) appears at the end of the polymer chain (i.e., as the last mer). As discussed further below, in certain preferred embodiments of the first-fourth embodiments, the vinyl group-functionalized aminosilane compound of formula (I) is positioned within the polymer chain by at least 50% of the polymer mers from the head of the polymer chain and up to 95% of the polymer mers from the head. Such positioning can be achieved by allowing the polymerization of the monomers to progress for a period of time (e.g., to proceed at least partially towards completion) prior to adding the vinyl group-functionalized aminosilane compound of formula I, and then allowing the polymerization of monomers to further proceed after the addition of the vinyl group-functionalized aminosilane compound of formula I. According to the first-fourth embodiments, the average number of vinyl group-functionalized aminosilane compound of formula (I) per polymer chain is about 0.1:1 to about 3:1. As a non-limiting example, if the average number is 0.1:1 then for each 10 polymer chains one vinyl group-functionalized aminosilane compound of formula (I) would be present. In certain embodiments of the first-fourth embodiments, the average number of vinyl group-functionalized aminosilane compound of formula (I) per polymer chain is 0.1:1 to 3:1 (e.g., 0.1:1, 0.2:1, 0.3:1, 0.4:1, 0.5:1, 0.6:1, 0.7:1, 0.8:1, 0.9:1, 1:1, 1.2:1, 1.4:1, 1.5:1, 1.6:1, 1.8:1, 2:1, 2.2:1, 2.4:1, 2.5:1, 2.6:1, 2.8:1, 3:1), 0.3 to 2:1, or 0.3 to 1:1. The average number of vinyl group-functionalized aminosilane compound of formula (I) per polymer chain can be measured by NMR (more specifically $H^1$-NMR of the —Si—$CH_3$).

Monomers

As mentioned above, according to the first-fourth embodiments, the polymer chains of the coupled polymer product comprise and/or the processes for preparing the coupled polymer product include polymerizing at least one conjugated diene monomer and optionally at least one vinyl aromatic monomer. In certain embodiments of the first-fourth embodiments, the polymer chains of the coupled polymer product consist of and/or the processes for preparing the coupled polymer product utilize only at least one conjugated diene monomer (i.e., as the only type of monomer). In certain embodiments of the first-fourth embodiments, the polymer chains of the coupled polymer product comprise and/or the processes for preparing the coupled polymer product include at least one conjugated diene monomer and at least one vinyl aromatic monomer (i.e., the at least one vinyl aromatic monomer is present). In certain embodiments of the first-fourth embodiments, the polymer chains of the coupled polymer product consist of and/or the processes for preparing the coupled polymer product consist of at least one conjugated diene monomer and at least one vinyl aromatic monomer (i.e., as the only type of monomers). According to the first-fourth embodiments, one or more than one type of conjugated diene monomer may be utilized. Similarly, according to the first-fourth embodiments, when at least one vinyl aromatic monomer is present, one or more than one type of vinyl aromatic monomer may be utilized.

As those of skill in the art understand, a conjugated diene is a compound that has two double carbon-carbon bonds (i.e., two —C═C— bonds) that are separated by a single bond (i.e., —C—C—); a conjugated diene will contain at least one —C═C—C═C— moiety). The particular structure of the conjugated diene monomer used in the processes of or present in the polymer chains of the embodiments of the first-fourth embodiments disclosed herein can vary. Non-limiting examples of suitable conjugated diene monomers for use in the embodiments of the first-fourth embodiments disclosed herein include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and combinations thereof. In certain embodiments of the first-fourth embodiments disclosed herein, the conjugated diene monomer comprises or is 1,3-butadiene. In certain embodiments of the first-fourth embodiments disclosed herein, the conjugated diene monomer consists of 1,3-butadiene.

As mentioned above, in certain embodiments of the first-fourth embodiments, the polymer chains (i.e., of the coupled polymer product) contain and/or the processes used for preparing a coupled polymer product utilize at least one vinyl aromatic monomer in addition to the at least one conjugated diene monomer. In those embodiments of the first-fourth embodiments disclosed herein wherein at least one type of vinyl aromatic monomer is present in the polymer chains and/or used in the processes for preparing a coupled polymer product, the at least one vinyl aromatic monomer may comprise at least one of styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol. In certain embodiments of the first-fourth embodiments disclosed herein, the at least one type vinyl aromatic monomer comprises styrene. In certain embodiments of the first-fourth embodiments, the vinyl aromatic monomer consists of styrene (i.e., the only vinyl aromatic monomer utilized is styrene). In certain embodiments of the first-fourth embodiments wherein the polymer chains comprise and/or the processes for preparing a coupled polymer product utilize at least one conjugated diene monomer in combination with at least one type of vinyl aromatic monomer, they are utilized at a weight ratio of 95:5 to 50:50 (e.g., 95-50% conjugated diene monomer and 5-50% vinyl aromatic monomer), including 95:5 to 65:35. In certain embodiments of the first-fourth embodiments wherein the polymer chains comprise (or alternatively consist of) and/or wherein the processes for preparing a coupled polymer product utilize a combination of 1,3-butadiene and styrene monomers, the styrene content of the polymer chains is about 10 to about 50% (e.g., 10%, 15%, 20%, 25%, 30%, 35%, 40%, 45%, 50%) by weight of the total monomer content (i.e., 1,3-butadiene+styrene), including 10-50% by weight, about 18 to about 40% by weight, and 18-40% by weight. In certain embodiments of the first-fourth embodiments wherein the polymer chains comprise (or alternatively consist of) and/or wherein the processes for preparing a coupled polymer product utilize a combination of 1,3-butadiene and styrene, the polymer chains have a microstructure with about 8 to about 99% by mass vinyl bonds (1,2-vinyl) in the butadiene portion, including 8-99% (e.g., 8%, 10%, 15%, 20%, 25%, 30%, 35%, 40%, 45%, 50%, 55%, 60%, 65%, 70%, 80%, 85%, 90%, 95%, 99%), about 10 to about 60% and 10-60% by weight. The vinyl bond content in the butadiene portion of a polymer chain or the resulting terminal-functionalized polymer can be determined by $H^1$-NMR and $C^{13}$-NMR (e.g., using a 300 MHz Gemini 300 NMR Spectrometer System (Varian).

Molecular Weight

According to the first-fourth embodiments disclosed herein, the molecular weight (Mw) of the coupled polymer product may vary. In certain embodiments of the first-fourth embodiments disclosed herein, the coupled polymer product has a Mw of 300,000 to 600,000 grams/mole (e.g., 300,000; 325,000; 350,000; 375,000; 400,000; 425,000; 450,000; 475,000; 500,000; 525,000; 550,000; 575,000; or 600,000 grams/mole). In certain embodiments of the first-fourth embodiments disclosed herein, the coupled polymer product has a Mw of 350,000 to 550,000. The Mw values referred to herein are weight average molecular weights which can be determined by using gel permeation chromatography (GPC) calibrated with styrene-butadiene standards and Mark-Houwink constants for the polymer in question.

According to the first-fourth embodiments disclosed herein, the molecular weight (Mw) of the polymer chains (arms) in the coupled polymer product may vary. In certain embodiments of the first-fourth embodiments disclosed herein, the polymer chains have a Mw of 50,000 to 200,000 grams/mole (e.g., 50,000; 60,000; 70,000; 80,000; 90,000; 100,000; 110,000; 120,000; 130,000; 140,000; 150,000; 160,000; 170,000; 180,000; 190,000; or 200,000 grams/mole) or 90,000 to 150,000 grams/mole (e.g., 90,000; 100,000; 110,000; 120,000; 130,000; 140,000; 150,000 grams/mole).

According to the first-fourth embodiments disclosed herein, the number average molecular weight (Mn) of the coupled polymer product may vary. In certain embodiments of the first-fourth embodiments disclosed herein, the coupled polymer product has a Mn of 200,000 to 400,000 grams/mole (e.g., 200,000; 225,000; 250,000; 275,000; 300,000; 325,000; 350,000; 375,000; or 400,000 grams/mole). In certain embodiments of the first-fourth embodiments disclosed herein, the coupled polymer product has a Mw of 200,000 to 300,000. The Mn values referred to herein are number average molecular weights which can be determined by using gel permeation chromatography (GPC) calibrated with styrene-butadiene standards and Mark-Houwink constants for the polymer in question.

According to the first-fourth embodiments disclosed herein, the number average molecular weight (Mn) of the polymer chains (arms) in the coupled polymer product may vary. In certain embodiments of the first-fourth embodiments disclosed herein, the polymer chains have a Mn of 70,000 to 200,000 grams/mole (e.g., 70,000; 80,000; 90,000; 100,000; 110,000; 120,000; 130,000; 140,000; 150,000; 160,000; 170,000; 180,000; 190,000; or 200,000 grams/mole), or 80,000 to 150,000 grams/mole (e.g., 80,000; 90,000; 100,000; 110,000; 120,000; 130,000; 140,000; or 150,000 grams/mole.

According to the first-fourth embodiments disclosed herein, the polydispersity (Mw/Mn) of the coupled polymer product may vary. In certain embodiments of the first-fourth embodiments disclosed herein, the coupled polymer product has a Mw/Mn of 1.3 to 2.5 to (e.g., 1.3, 1.4, 1.5, 1.6, 1.7, 1.8, 1.9, 2, 2.1, 2.2, 2.3, 2.4, or 2.5, preferably 1.5 to 2.

According to the first-fourth embodiments disclosed herein, the glass transition temperature (Tg) of the coupled polymer product may vary. In certain embodiments of the first-fourth embodiments disclosed herein, the coupled polymer product has a Tg of −25 to −50° C. (e.g., −25, −30, −35, −40, −45, or −50° C.). In certain embodiments of the first-fourth embodiments disclosed herein, the coupled polymer product has a Tg of −30 to −45° C. The Tg values referred to herein can be determined by DSC (Differential Scanning Calorimetry), as described in the working examples herein.

Vinyl Group-Functionalized Aminosilane Compound Having Formula (I)

As discussed above, the processes of the first and third embodiments include reacting living end polymer chains with a vinyl group-functionalized aminosilane compound having formula (I): $(H_2C=CH_2)$-(A)-Si($R^1$)($R^2$)($R^3$). According to formula (I), A is divalent and selected from $C_6$-$C_{20}$ aromatic hydrocarbons optionally substituted with an aliphatic alkylene moiety to which the Si is bonded; each of $R^1$, $R^2$, and $R^3$ are independently selected from linear or branched $C_1$-$C_{12}$ hydrocarbyl and —N($R^4$)($R^5$), with at least one of $R^1$, $R^2$ and $R^3$ selected from —N($R^4$)($R^5$), wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring; and $R^1$ and $R^2$ are optionally bonded together into a ring comprising two nitrogen atoms. The $H_2C=CH_2$ portion of the compound of formula (I) can be referred to as a vinyl group. By stating that the A portion of the compound of formula (I) is divalent is meant to indicate that it is bonded to both the $(H_2C=CH_2)$— and the Si portions of the compound.

As stated above, the A portion of the compound of formula (I) is divalent and selected from $C_6$-$C_{20}$ aromatic hydrocarbons (i.e., hydrocarbons having 6 to 20 carbon atoms in one or more aromatic rings). Preferably, the A portion of the compound of formula (I) has only one aromatic ring. In certain embodiments of the first-fourth embodiments, the A portion of the compound of formula (I) is selected from aromatic hydrocarbons having 6-18 carbon atoms (e.g., 6, 7, 8, 9, 10, 11, 12, 13, 14, 15, 16, 17 or 18 carbon atoms), or from aromatic hydrocarbons having 6-12 carbon atoms (e.g., 6, 7, 8, 9, 10, 11 or 12). According to the first-fourth embodiments, in certain preferred embodiments the A portion of formula (I) is phenylene (i.e., a divalent aromatic moiety derived from benzene and having 6 carbon atoms). The A portion is optionally substituted with an aliphatic hydrocarbyl/alkylene group to which the Si is bonded. In certain embodiments of the first-fourth embodiments, the A portion of the compound of formula (I) is divalent, selected from $C_6$-$C_{20}$ aromatic hydrocarbons, and is not substituted with an aliphatic hydrocarbyl/alkylene group. In other embodiments of the first-fourth embodiments, the A portion of the compound of formula (I) is divalent, selected from $C_6$-$C_{20}$ aromatic hydrocarbons, and is substituted with an aliphatic hydrocarbyl/alkylene group.

In those embodiments of the first-fourth embodiments wherein the A portion of the compound of formula (I) is substituted with an aliphatic hydrocarbyl/alkylene group, preferably only one such aliphatic hydrocarbyl/alkylene group is present which is divalent and is bonded at its other end or side to the Si portion of the compound. Preferably, the aliphatic hydrocarbyl/alkyene group substituent is selected from $C_1$-$C_{12}$ groups (i.e., having 1, 2, 3, 4, 5, 6, 7, 8, 9, 10, 11 or 12 carbon atoms) or from $C_1$-$C_6$ groups (i.e., having 1, 2, 3, 4, 5, or 6 carbon atoms).

As stated above, according to the first-fourth embodiments, the compound of formula (I) includes $R^1$, $R^2$ and $R^3$ groups upon the Si. Each of the $R^1$, $R^2$ and $R^3$ groups are independently chosen from linear or branched $C_1$-$C_{12}$ hydrocarbyl (e.g., a hydrocarbyl group having 1, 2, 3, 4, 5, 6, 7, 8, 9, 10, 11, or 12 carbon atoms) and —N($R^4$)($R^5$), with at least one of $R^1$, $R^2$ and $R^3$ being selected from —N($R^4$)($R^5$). In certain embodiments of the first-fourth embodiments, each of the $R^1$, $R^2$ and $R^3$ groups are independently chosen from linear or branched $C_1$-$C_6$ hydrocarbyl (e.g., a hydrocarbyl group having 1, 2, 3, 4, 5, or 6 carbon atoms) and —N($R^4$)($R^5$), with at least one of $R^1$, $R^2$ and $R^3$ being selected from —N($R^4$)($R^5$). According to formula (II) no amine nitrogen (i.e., —NH) is present in compounds according to formula (II). In certain embodiments of the first-fourth embodiments, only one of the $R^1$, $R^2$ and $R^3$ groups is selected from —N($R^4$)($R^5$). In other embodiments of the first-fourth embodiments, two of the $R^1$, $R^2$ and $R^3$ groups are selected from —N($R^4$)($R^5$). In yet other embodiments of the first-fourth embodiments, all three of the $R^1$, $R^2$ and $R^3$ groups are selected from —N($R^4$)($R^5$). According to the first-fourth embodiments, each of the $R^1$, $R^2$ and $R^3$ groups are preferably aliphatic. However, in certain embodiments of the first-fourth embodiments, one or more of the $R^1$, $R^2$ and $R^3$ groups can be selected from aromatic hydrocarbyl of $C_6$-$C_{18}$ or aromatic hydrocarbyl of $C_6$-$C_{12}$. According to formula (I), when $R^1$ and $R^2$ are selected from —N($R^4$)($R^5$), they are optionally bonded together into a ring comprising the two nitrogen atoms together with the Si; in such embodiments, each $R^4$ may also be part of the ring structure with each $R^5$ remaining as a nitrogen substituent or a portion of each $R^4$ may additionally constitute a second carbon-based ring structure. In other embodiments, only one of $R^1$, $R^2$, and $R^3$ is —N($R^4$)($R^5$) and the nitrogen is bonded into a ring structure with its respective $R^4$ and $R^5$ groups.

Each of the $R^4$ and $R^5$ groups are independently selected from aliphatic hydrocarbyl of $C_1$-$C_{12}$ (e.g., a hydrocarbyl group having 1, 2, 3, 4, 5, 6, 7, 8, 9, 10, 11, or 12 carbon atoms) or aromatic hydrocarbyl of $C_6$-$C_{18}$ (i.e., an aromatic hydrocarbyl group having 6, 7, 8, 9, 10, 11, 12, 13, 14, 15, 16, 17, or 18 carbon atoms), with $R^4$ and $R^5$ optionally bonded together into a ring. $R^4$ and $R^5$ are preferably aliphatic and more preferably selected from aliphatic hydrocarbon of $C_1$-$C_6$, most preferably ethyl or methyl.

Non-limiting examples of suitable vinyl group-functionalized aminosilane compounds having formula (I) include, but are not limited to, N,N'-dialkylamino dialkylsilyl styrenes such as 4-((N,N-dimethylamino)dimethylsilyl)styrene, 3-((N,N-dimethylamino)dimethylsilyl)styrene, 4-((N,N-diethylamino)dimethylsilyl)styrene, 3-((N,N-diethylamino)dimethylsilyl)styrene, 4-((N,N-dipropylamino)dimethylsilyl)styrene, 3-((N,N-dipropylamino)dimethylsilyl)styrene, 4-((N,N-dibutylamino)dimethylsilyl)styrene, 3-((N,N-dibutylamino)dimethylsilyl)styrene, 4-((N,N-dimethylamino)diethylsilyl)styrene, 3-((N,N-dimethylamino)diethylsilyl)styrene, 4-((N,N-diethylamino)diethylsilyl)styrene, 3-((N,N-diethylamino)diethylsilyl)styrene, 4-((N,N-dipropylamino)diethylsilyl)styrene, 3-((N,N-dipropylamino)diethylsilyl)styrene, 4-((N,N-dibutylamino)diethylsilyl)styrene, 3-((N,N-dibutylamino)diethylsilyl)styrene, 4-((bis(N,N-dimethylamino))methylsilyl)styrene, 4-(1,2,5-trimethyl-2,5-diaza-1-silylcyclopentyl)styrene, 4-((pyrrolidinyl) dimethylsilyl)styrene, and 4-(2'-octahydro-1,2,3-trimethyl-2-silylbenzimidazolyl)styrene.

Functionalizing Compounds of Formula (II) and (III)

As discussed above, the coupled polymer product of the second embodiment comprises up to 5 polymer chains bonded to a functionalizing compound of formula (II) and the coupled polymer product of the fourth embodiment comprises up to 5 polymer chains bonded to a functionalizing compound of formula (III). Similarly, the process of the first embodiment disclosed herein includes reacting polymer chains with a functionalizing compound of formula (II) to produce a polymer product comprising up to 5 polymer chains bonded to a functionalizing compound of formula (II) and the process of the third embodiment disclosed herein includes reacting polymer chains with a functionalizing compound of formula (III) to produce a polymer product comprising up to 5 polymer chains bonded to a functionalizing compound of formula (III).

Formula (II) is as follows:

$$N{\equiv}C\text{-}(Q^1)\text{-}Si(X^1)(X^2)(X^3)$$

and according to formula (II), $Q^1$ is divalent and selected from $C_1$-$C_{12}$ (i.e., $C_1$, $C_2$, $C_3$ $C_4$, $C_5$, $C_6$, $C_7$, $C_8$, $C_9$, $C_{10}$, $C_{11}$, or $C_{12}$) alkylene moieties or aromatic moieties, each X is independently selected from halogens and alkoxy of $OR^6$ wherein each $R^6$ is independently selected from $C_1$-$C_{12}$ aliphatic hydrocarbyl (i.e., $C_1$, $C_2$, $C_3$ $C_4$, $C_5$, $C_6$, $C_7$, $C_8$, $C_9$, $C_{10}$, $C_{11}$, or $C_{12}$). In certain embodiments of the first and second embodiments, $Q^1$ is selected from divalent aliphatic alkylene of $C_1$-$C_{12}$ (i.e., $C_1$, $C_2$, $C_3$ $C_4$, $C_5$, $C_6$, $C_7$, $C_8$, $C_9$, $C_{10}$, $C_{11}$, or $C_{12}$). In other embodiments of the first and second embodiments, $Q^1$ is selected from divalent aromatic moieties of $C_6$-$C_{18}$ (e.g., $C_6$, $C_7$, $C_8$, $C_9$, $C_{10}$, $C_{11}$, $C_{12}$, $C_{13}$, $C_{14}$, $C_{15}$, $C_{16}$, $C_{17}$, or $C_{18}$). In certain embodiments of the first and second embodiments $R^6$ in formula (II) is aliphatic hydrocarbyl of $C_1$-$C_6$, preferably methyl or ethyl.

In certain embodiments of the first and second embodiments, each X of formula (II) (i.e., each of $X^1$, $X^2$ and $X^3$) is independently selected from halogens. The halogen for each X may be the same or different, but is preferably the same. Preferably the halogen is chlorine or bromine, most preferably chlorine. Exemplary compounds wherein each X is chlorine include 3-cyanobutyl-trichlorosilane, 3-cyanopropyl-trichlorosilane, 1-cyanoethyl-trichlorosilane, and 2-cyanoethyl-trichlorosilane.

As mentioned above, $Q^1$ of formula (II) is divalent and is selected from $C_1$-$C_{12}$ alkylene moieties and divalent $C_6$-$C_{18}$ aromatic moieties. By divalent is meant that $Q^1$ is bonded to both the carbon of the cyano group and to the silicon in formula (II). In certain embodiments of the first and second embodiments, $Q^1$ is selected from $C_1$-$C_{12}$ aliphatic divalent alkylene moieties. In certain embodiments, wherein $Q^1$ is selected from $C_1$-$C_{12}$ aliphatic divalent alkylene moieties, the aliphatic divalent alkylene moiety is linear. In certain embodiments of the first and second embodiments wherein $Q^1$ is selected from $C_1$-$C_{12}$ aliphatic divalent alkylene moiety, $Q^1$ is branched (i.e., the cyano is not attached to the last C in the chain of the alkylene moiety). In certain embodiments of the first and second embodiments wherein $Q^1$ is selected from $C_1$-$C_{12}$ aliphatic divalent alkylene moieties, the aliphatic divalent alkylene moiety is $C_1$-$C_6$, or $C_2$-$C_4$.

As those of skill in the art will understand, formula (II) as represented above represents the functionalizing compound before bonding to the polymer chains occurs. Functionalizing compounds having formula (II) are capable of bonding with up to five polymer chains. More specifically, such bonding may occur by replacement of any of $X^1$, $X^2$, or $X^3$ with a polymer chain as well as at the cyano end of formula (II) (for up to a total of five polymer chains bonded to the functionalizing compound of formula (II)). Accordingly, once the functionalizing compound of formula (II) has bonded to one or more polymer chains, the structure of formula (II) as-bonded can more precisely be described as a "residue" of the functionalizing compound of formula (II) wherein at least one (and up to all) of $X^1$, $X^2$, $X^3$ and/or the unsaturated bond(s) in the cyano group (i.e., N≡C) have been replaced by a polymer chain.

Formula (III) is as follows:

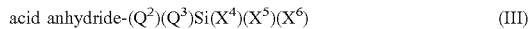

acid anhydride-$(Q^2)(Q^3)Si(X^4)(X^5)(X^6)$    (III)

and according to formula (III) $Q^2$ comprises at least two methylene groups bonded together and forming a cyclic acid anhydride for formula (III), wherein $Q^3$ is divalent and selected from $C_1$-$C_{12}$ (i.e., $C_1$, $C_2$, $C_3$ $C_4$, $C_5$, $C_6$, $C_7$, $C_8$, $C_9$, $C_{10}$, $C_{11}$, or $C_{12}$) alkylene moieties or aromatic moieties, each X is a leaving group independently selected from halogens and alkoxy of $OR^7$ wherein each $R^7$ is independently selected from $C_1$-$C_{12}$ (i.e., $C_1$, $C_2$, $C_3$ $C_4$, $C_5$, $C_6$, $C_7$, $C_8$, $C_9$, $C_{10}$, $C_{11}$, or $C_{12}$) aliphatic hydrocarbyl or $C_1$-$C_6$ aliphatic hydrocarbyl. In certain embodiments of the third and fourth embodiments, $Q^3$ is selected from aliphatic divalent alkylene moieties of $C_1$-$C_{12}$ (i.e., $C_1$, $C_2$, $C_3$ $C_4$, $C_5$, $C_6$, $C_7$, $C_8$, $C_9$, $C_{10}$, $C_{11}$, or $C_{12}$). In other embodiments of the third and fourth embodiments, $Q^3$ is selected from divalent aromatic moieties of $C_6$-$C_{18}$ (e.g., $C_6$, $C_7$, $C_8$, $C_9$, $C_{10}$, $C_{11}$, $C_{12}$, $C_{13}$, $C_{14}$, $C_{15}$, $C_{16}$, $C_{17}$, or $C_{18}$) or $C_6$ to $C_{12}$. In certain embodiments of the third and fourth embodiments $R^7$ is preferably methyl or ethyl.

In certain embodiments of the third and fourth embodiments, each X of formula (III) (i.e., each of $X^3$, $X^4$ and $X^5$) is independently selected from halogens. The halogen for each X may be the same or different, but is preferably the same. Preferably the halogen is chlorine or bromine, most preferably chlorine.

As mentioned above $Q^2$ comprises at least two (e.g., 2, 3, 4, or more) methylene groups bonded together and forming a cyclic acid anhydride for formula (III). In preferred embodiments of the third and fourth embodiment, $Q^2$ contains two methylene groups bonded together to form a cyclic acid anhydride (with $Q^3$ bonded to both $Q^2$ and Si in formula (III)).

Exemplary compounds corresponding to the acid anhydride-$Q^2$ portion of formula (III) include, but are not limited to, succinic anhydride, phthalic anhydride, and 1,2-cyclohexanedicarboxylic acid anhydride.

As those of skill in the art will understand, formula (III) as represented above represents the functionalizing compound before bonding to the polymer chains occurs. Functionalizing compounds having formula (III) are capable of bonding with up to five polymer chains. More specifically, such bonding may occur by replacement of any of $X^3$, $X^4$, or $X^5$ with a polymer chain as well as at the acid anhydride end of formula (III) (with the opening of the ring) for up to a total of five polymer chains bonded to the functionalizing compound of formula (III)). Accordingly, once the functionalizing compound of formula (III) has bonded to one or more polymer chains, the structure of formula (III) as-bonded can more precisely be described as a "residue" of the functionalizing compound of formula (III) wherein at least one (and up to all) of $X^3$, $X^4$, $X^5$ have been replaced by a polymer chain and/or the acid anhydride ring has opened and allowed for bonding of up to two polymer chains.

Second Functionalizing Compound

In certain embodiments of the first and third embodiments, the process for preparing the coupled polymer product includes the use of a second functionalizing compound after the use of either the functionalizing compound of formula (II) or the functionalizing compound of formula (III). Correspondingly, in certain embodiments of the second and fourth embodiments, the coupled polymer product has polymer chains bound not only to a compound of formula (II) or formula (III), but also to a second functionalizing compound. The second functionalizing compound should be viewed as optional, i.e., the processes of the first and third embodiments do not necessarily use a second functionalizing compound and the coupled polymer products of the second and fourth embodiments do not necessarily contain a second functionalizing compound.

In those embodiments of the first-fourth embodiments wherein a second functionalizing compound is utilized, the structure of the second functionalizing compound may vary. Generally, the second functionalizing compound will have the structure of formula (IV): $[F][CH_2]_a[Si][R^8]_b[X^7]_c$ wherein F represents a functional group, each $R^8$ represent a hydrocarbyl of $C_1$ to $C_{12}$ (e.g., 1, 2, 3, 4, 5, 6, 7, 8, 9, 10, 11 or 12 carbons), each $X^7$ represents a leaving group selected from halogens and alkoxy of $OR^9$ wherein each $R^9$ is independently selected from $C_1$-$C_{12}$ (e.g., 1, 2, 3, 4, 5, 6, 7, 8, 9, 10, 11 or 12 carbons) aliphatic hydrocarbyl, a is an integer of 1-10, b and c are selected from integers of 0, 1, 2 and 3 with a sum (i.e., b+c) of 3. In certain embodiments of the first-fourth embodiments, formula (IV) has a selected from an integer of 2 to 6, preferably 3 to 4. In certain embodiments of the first-fourth embodiments, formula (IV) has three halogens (i.e., c is 3). In other embodiments of the first-fourth embodiments, formula (IV) has two halogens (i.e., c is 2) or 1 halogen (i.e., c is 1). In yet other embodiments of the first-fourth embodiments, formula (IV) has no halogens (i.e., c is 0 and b is 3). In certain embodiments of the first-fourth embodiments, formula (IV) has each $R^8$ selected from hydrocarbon of $C_1$ to $C_6$, preferably $C_1$ to $C_3$, even more preferably ethyl or methyl. The halogen of each X may be same or different, but is preferably the same. Preferably, the halogen is chlorine or bromine, most preferably chlorine. When $X^7$ is present (i.e., when c is an integer of 1, 2, or 3), and at least one $X^7$ is alkoxy of $OR^9$, $R^9$ is preferably selected from $C_1$-$C_6$, even more preferably ethyl or methyl.

The particular functional group present in F may vary widely. Exemplary functional groups include those containing one or more nitrogen (preferably where any nitrogen lacks a hydrogen), including but not limited to nitrogen substituted with one or two trialkylsilyl groups, nitrogen double bonded to a carbon which carbon is bonded to one or more carbons which are in turn bonded to one or more carbons, and cyclic nitrogen (preferably with at least one nitrogen double bonded to a carbon which carbon is bonded to one or more. Other exemplary functional groups include (1) those containing one or more epoxy, including but not limited to cyclic epoxy, linear epoxy and combinations thereof, such as glycidoxy, cycloaliphatic epoxide (e.g., 1,2-epoxycyclohexane), (2) those containing isocyanate (i.e., O=C=N—), or (3) a polysiloxane (e.g., a cyclic polysiloxane with the Si optionally substituted with one or two alkyl groups such as cyclic dimethyl polysiloxanes having 3-6 Si in the cyclic structure).

Polymerization

As mentioned above, the processes of the first and third embodiments include polymerizing monomers using an anionic initiator to produce polymer chains with a living end. Anionic polymerization of conjugated diene monomers generally involves the use of an anionic initiator in combination with the monomer(s) and an optional solvent, the general process of which (i.e., other than the use of the functionalizing compound disclosed herein) is well known to those having skill in the art. Generally, the monomer or monomers are polymerized according to various suitable methods such as batch, semi-continuous, or continuous operations. The polymerization can also be carried out in a number of different polymerization reactor systems, including but not limited to bulk polymerization, vapor phase polymerization, solution polymerization, suspension polymerization, and emulsion polymerization; in solution polymerization, the concentration of the monomer(s) in the solution is preferably within a range of 5 to 50% by mass, more preferably 10 to 30% by mass. The polymerization system is not particularly limited and may be a batch system or a continuous system. In certain embodiments of the first and third embodiments disclosed herein, the anionic initiator comprises an organic alkaline metal compound, preferably a lithium-containing compound. Examples of lithium-containing compounds useful as anionic initiators include, but are not limited to, hydrocarbyl lithium compounds, lithium amide compounds, and similar sodium compounds. In certain embodiments of the first and third embodiments disclosed herein, the amount of the lithium compound used as the anionic initiator is preferably within a range of 0.2 to 20 millimoles per 100 g of the monomer. In certain embodiments of the first and third embodiments, a functionalized initiator is utilized. Non-limiting examples of functionalized initiators include organic alkaline metal compounds (e.g., an organolithium compound) that additionally include one or more heteroatoms (e.g., nitrogen, oxygen, boron, silicon, sulfur, tin, and phosphorus atoms) or heterocyclic groups containing the foregoing, frequently one or more nitrogen atoms (e.g., substituted aldimines, ketimines, secondary amines, etc.) optionally pre-reacted with a compound such as diisopropenyl benzene. Many functional initiators are known in the art. Exemplary ones are disclosed in U.S. Pat. Nos. 5,153,159, 5,332,810, 5,329,005, 5,578,542, 5,393,721, 5,698,464, 5,491,230, 5,521,309, 5,496,940, 5,567,815, 5,574,109, 5,786,441, 7,153,919, 7,868,110 and U.S. Patent Application Publication No. 2011-0112263, which are incorporated herein by reference. In certain embodiments of the first and third embodiments, a functional nitrogen-containing initiator is utilized; non-limiting examples include cyclic amines, particularly cyclic secondary amines such as azetidine; pyrrolidine; piperidine; morpholine; N-alkyl piperazine; hexamethyleneimine; heptamethyleneimine; and dodecamethyleneimine. In other embodiments of the first and third embodiments, the anionic initiator is preferably not functionalized. In certain embodiments of the first-sixth embodiments, the anionic initiator used does not include any nitrogen atom; such an initiator can also be described as lacking any nitrogen atom.

Non-limiting examples of hydrocarbyl lithium compounds suitable for use as anionic initiators in the processes of the first and third embodiments include ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, cyclopentyl lithium, a reaction product of diisopropenylbenzene and butyl lithium, and mixtures thereof. Among these, alkyl lithium compounds such as ethyl lithium, n-propyl lithium, isopropyl lithium, n-butyl lithium, sec-butyl lithium, tert-octyl lithium, n-decyl lithium and so on are preferable, and n-butyl lithium is particularly preferable. Generally, the anionic polymerization is conducted using monomers in a hydrocarbon solvent inactive to the polymerization reaction, examples of which include hydrocarbon solvents such as aromatic hydrocarbon, aliphatic hydrocarbon, or cycloaliphatic hydrocarbon. Non-limiting examples of hydrocarbon solvents inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene, and mixtures thereof.

In certain embodiments of the processes of the first and third embodiments, the anionic polymerization process is carried out in the presence of a randomizer or polar agent. The randomizer can control the microstructure of the resulting polymer, and has an action such that the 1,2-bond content in the butadiene unit (or butadiene portion) of the polymer using, for example, 1,3-butadiene as a monomer is controlled, and butadiene units and styrene units in the copolymer using 1,3-butadiene and styrene as a monomer are randomized, or the like. Non-limiting examples of the randomizer or polar agent include dimethoxybenzene, tetrahydrofuran, linear and cyclic oligomeric oxolanyl alkanes such as 2,2-bis(2'-tetrahydrofuryl)propane, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer or polar agent used is preferably within a range of 0.01 to 100 molar equivalents per 1 mole of the organic alkaline metal compound as a polymerization initiator.

The polymerization temperature in the anionic polymerization of the processes of the first and third embodiments may vary, but is preferably within a range of 0 to 150° C., more preferably 20 to 130° C. The polymerization may be carried out under a generating pressure or, preferably, at a pressure sufficient to keep the reaction monomers substantially in a liquid phase. When the polymerization reaction is carried out under a pressure higher than the generating pressure, the reaction system is preferably pressurized with an inert gas. Preferably, any reaction-obstructing substances, such as water, oxygen, carbon dioxide, protonic compounds, and the like are removed before beginning the polymerization reaction.

Rubber Compositions

Coupled Polymer Product

As discussed above, the fifth and sixth embodiments disclosed herein are rubber composition comprising either (a) the coupled polymer product of the second embodiment or the coupled polymer product resulting from the process of the first embodiment; or (b) the coupled polymer product of the fourth embodiment or the coupled polymer product resulting from the process of the third embodiment. The discussions contained herein as to various embodiments of the first-fourth embodiments (i.e., relating to the coupled polymer products or to a process for preparing a coupled polymer product), should be understood to apply fully to the discussion of the fifth and sixth embodiments as if fully set forth herein. Rubber compositions according to the fifth embodiment disclosed herein may comprise: (a) 10-100 parts of the coupled polymer product of the second embodiment or the coupled polymer product resulting from the process of the first embodiment, (b) 0-90 parts of at least one diene monomer-containing polymer; and (c) 5-200 phr of at least one reinforcing filler selected from carbon black, silica, and combinations thereof. Rubber compositions according to the sixth embodiment disclosed herein may comprise: (a) 10-100 parts of the coupled polymer product of the fourth embodiment or the coupled polymer product resulting from the process of the third embodiment, (b) 0-90 parts of at least one diene monomer-containing polymer; and (c) 5-200 phr of at least one reinforcing filler selected from carbon black, silica, and combinations thereof. In certain embodiments of the fifth and sixth embodiments, the rubber composition further comprises a cure package, as discussed in more detail below. In certain embodiments of the fifth and sixth embodiments, the rubber composition further comprises a cure package as well as at least one of the other ingredients discussed below (e.g., oils, waxes, processing aids, antioxidants, tackifying resins, reinforcing resins, and peptizers).

In certain embodiments of the fifth and sixth embodiments, the amount of component (a), i.e., the coupled polymer product, may vary within 10-100 parts (e.g., 10, 15, 20, 25, 30, 35, 40, 45, 50, 55, 60, 65, 70, 75, 80, 85, 90, 95 or 100 parts) such as being present in amounts of 20-100 parts, 30-100 parts, 40-100 parts, 50-100 parts, 10-90 parts, 10-80 parts, 10-70 parts, 10-60 parts, 10 parts, 20 parts, 30 parts, 40 parts, 50 parts, 60 parts, 70 parts, 80 parts, 90 parts, or 100 parts, etc. One or more than one coupled polymer product may be utilized as component (a) in such rubber compositions.

According to the fifth and sixth embodiments, the amount of component (b), i.e., the amount of the at least one diene monomer-containing polymer, which is present in the rubber composition may vary so as to allow for 100 total parts of polymer (rubber) in combination with component (a). Thus, according to the third embodiment, the amount of component (b) may be 0-90 parts (e.g., 0 parts, 10 parts, 20 parts, 30 parts, 40 parts, 50 parts, 60 parts, 70 parts, 80 parts, or 90 part), 10-90 parts, 10-80 parts, 10-70 parts, 10-60 parts, 20-90 parts, 20-80 parts, etc.

Filler

The 5 to 200 phr of reinforcing filler contained within the rubber compositions of the fifth and sixth embodiments should be understood to refer to the total amount of reinforcing filler when more than one reinforcing filler is utilized. In other words, such rubber compositions may comprise carbon black filler, silica filler, or a combination of carbon black and silica filler in the foregoing specified amounts. The reinforcing filler may also include additional reinforcing fillers, as discussed in more detail below. Moreover, it should be understood that one or more than one of each may be utilized as reinforcing filler in the foregoing specified total amounts, i.e., one carbon black, more than one carbon black, one carbon black and one silica, one carbon black and more than one silica filler, more than one carbon black and one silica, or more than one carbon black and more than one silica filler. In certain embodiments of the fifth and sixth embodiments, the rubber composition comprises 10 to 200 phr, 20 to 200 phr, 30 to 200 phr, 40 to 200 phr, 50 to 200 phr, 10 to 180 phr, 20 to 180 phr, 30 to 180 phr, 40 to 180 phr, 10 to 150 phr, 20 to 150 phr, 30 to 150 phr, 40 to 150 phr, 10 to 120 phr, 20 to 120 phr, 30 to 120 phr, 40 to 120 phr, 10 to 100 phr, 20 to 100 phr, 30 to 100 phr, 40 to 100 phr, 10 phr, 20 phr, 30 phr, 40 phr, 50 phr, 60 phr, 70 phr, 80 phr, 90 phr, 100 phr, 110 phr, 120 phr, 130 phr, 140 phr, 150 phr, 160 phr, 170 phr, 180 phr, 190 phr, or 200 phr of at least one reinforcing filler selected from carbon black, silica, and combinations thereof. In certain embodiments of the fifth and sixth embodiments, the rubber composition comprises 10 to 200 phr, 20 to 200 phr, 30 to 200 phr, 40 to 200 phr, 50 to 200 phr, 10 to 180 phr, 20 to 180 phr, 30 to 180 phr, 40 to 180 phr, 10 to 150 phr, 20 to 150 phr, 30 to 150 phr, 40 to 150 phr, 10 to 120 phr, 20 to 120 phr, 30 to 120 phr, 40 to 120 phr, 10 to 100 phr, 20 to 100 phr, 30 to 100 phr, 40 to 100 phr, 10 phr, 20 phr, 30 phr, 40 phr, 50 phr, 60 phr, 70 phr, 80 phr, 90 phr, 100 phr, 110 phr, 120 phr, 130 phr, 140 phr, 150 phr, 160 phr, 170 phr, 180 phr, 190 phr, or 200 phr of at least one reinforcing silica filler; in certain such embodiments, the rubber composition contains less than 25, less than 20, less than 10, less than 5, or even 0 phr of carbon black filler. In certain embodiments of the fifth and sixth embodiments, the rubber composition comprises 10 to 200 phr, 20 to 200 phr, 30 to 200 phr, 40 to 200 phr, 50 to 200 phr, 10 to 180 phr, 20 to 180 phr, 30 to 180 phr, 40 to 180 phr, 10 to 150 phr, 20 to 150 phr, 30 to 150 phr, 40 to 150 phr, 10 to 120 phr, 20 to 120 phr, 30 to 120 phr, 40 to 120 phr, 10 to 100 phr, 20 to 100 phr, 30 to 100 phr, 40 to 100 phr, 10 phr, 20 phr, 30 phr, 40 phr, 50 phr, 60 phr, 70 phr, 80 phr, 90 phr, 100 phr, 110 phr, 120 phr, 130 phr, 140 phr, 150 phr, 160 phr, 170 phr, 180 phr, 190 phr, or 200 phr of at least one reinforcing carbon black filler; in certain such embodiments, the rubber composition contains less than 25, less than 20, less than 10, less than 5, or even 0 phr of silica filler. In certain embodiments of the fifth and sixth embodiment, the rubber composition comprises at least one additional reinforcing filler other than carbon black or silica, examples of which are discussed below.

As used herein, the term "reinforcing" with respect to "reinforcing carbon black filler," "reinforcing silica filler," and "reinforcing filler" generally should be understood to encompass both fillers that are traditionally described as reinforcing as well as fillers that may traditionally be described as semi-reinforcing. Traditionally, the term "reinforcing filler" is used to refer to a particulate material that has a nitrogen absorption specific surface area ($N_2SA$) of more than about 100 $m^2/g$, and in certain instances more than 100 $m^2/g$, more than about 125 $m^2/g$, more than 125 $m^2/g$, or even more than about 150 $m^2/g$ or more than 150 $m^2/g$. Alternatively (or additionally), the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area ($N_2SA$), or both, to a non-reinforcing filler (as discussed below) and a reinforcing filler. In certain embodiments of the fifth and sixth embodiments disclosed herein, the term "reinforcing filler" is used to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments of the fifth and sixth embodiments disclosed herein, the term "reinforcing filler" is used to refer to a particulate material that has a particle size of about 10 nm up to about 1000 nm, including 10 nm to 1000 nm, about 10 nm up to about 50 nm and 10 nm to 50 nm.

Silica and Silica Coupling Agents

As discussed above, in certain embodiments of the fifth and sixth embodiments disclosed herein the at least one reinforcing filler comprises silica. One or more than one reinforcing silica filler may be utilized. Suitable reinforcing silica fillers for use in certain embodiments of the fifth and sixth embodiments are well known. Non-limiting examples of reinforcing silica fillers suitable for use in certain embodiments of the fifth and sixth embodiments include, but are not limited to, precipitated amorphous silica, wet silica (hydrated silicic acid), dry silica (anhydrous silicic acid), fumed silica, calcium silicate and the like. Other suitable reinforcing silica fillers for use in certain embodiments of the fifth and sixth embodiments include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4\cdot 3SiO_4\cdot 5H_2O$ etc.), aluminum calcium silicate ($Al_2O_3\cdot CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the fifth and sixth embodiments disclosed herein, the rubber composition comprises a reinforcing silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In certain embodiments of the fifth and sixth embodiments disclosed herein, the rubber composition comprises reinforcing silica filler having a pH of about 5.5 to about 7 or slightly over 7, preferably about 5.5 to about 6.8. Some of the commercially available reinforcing silica fillers which can be used in certain embodiments of the fifth and sixth embodiments include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). As well, a number of useful commercial grades of different reinforcing silica fillers are also available from Degussa Corporation (e.g., VN2, VN3), Rhone Poulenc (e.g., Zeosil™ 1165MP), and J. M. Huber Corporation.

In certain embodiments of the fifth and sixth embodiments disclosed herein, when the at least one reinforcing filler includes silica filler, one or more than one silica coupling agents may also (optionally) be utilized. Silica coupling agents are useful in preventing or reducing aggregation of the silica filler in rubber compositions. Aggregates of the silica filler particles are believed to increase the viscosity of a rubber composition, and, therefore, preventing this aggregation reduces the viscosity and improves the processability and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents for use in certain embodiments of the fifth and sixth embodiments disclosed herein include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments, the silica coupling agent can be added to the rubber composition in the form of a pre-treated silica; a pre-treated silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^{10}_p Si(OR^{11})_{4-p}$ where each $R^{11}$ is independently a monovalent organic group, and p is an integer from 1 to 3, with the proviso that at least one $R^{10}$ is an alkyl group. Preferably p is 1. Generally, each $R^{10}$ independently comprises $C_1$ to $C_{20}$ aliphatic, $C_5$ to $C_{20}$ cycloaliphatic, or $C_6$ to $C_{20}$ aromatic; and each $R^{11}$ independently comprises $C_1$ to $C_6$ aliphatic. In certain exemplary embodiments, each $R^{10}$ independently comprises $C_6$ to $C_{15}$ aliphatic and in additional embodiments each $R^{10}$ independently comprises $C_8$ to $C_{14}$ aliphatic. Mercapto silanes have the general formula $HS-R^{13}-Si(R^{14})(R^{15})^2$ where $R^{13}$ is a divalent organic group, $R^{14}$ is a halogen atom or an alkoxy group, each $R^{15}$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula $B-S-R^{16}-Si-X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^{16}$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in certain embodiments of the fifth and sixth embodiments include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in certain embodiments of the fifth and sixth embodiments include bis(trialkoxysilylorgano) disulfides and bis(trialkoxysilylorgano)tetrasulfides. Specific non-limiting examples of bis(trialkoxysilylorgano)disulfides include, but are not limited to, 3,3'-bis(triethoxysilylpropyl) disulfide, 3,3'-bis(trimethoxysilylpropyl) disulfide, 3,3'-bis(tributoxysilylpropyl)disulfide, 3,3'-bis(tri-t-butoxysilylpropyl)disulfide, 3,3'-bis(trihexoxysilylpropyl) disulfide, 2,2'-bis(dimethylmethoxysilylethyl)disulfide, 3,3'-bis(diphenylcyclohexoxysilylpropyl)disulfide, 3,3'-bis (ethyl-di-sec-butoxysilylpropyl)disulfide, 3,3'-bis (propyldiethoxysilylpropyl)disulfide, 12,12'-bis (triisopropoxysilylpropyl)disulfide, 3,3'-bis (dimethoxyphenylsilyl-2-methylpropyl)disulfide, and mixtures thereof. Non-limiting examples of bis(trialkoxysilylorgano)tetrasulfide silica coupling agents suitable for use in certain embodiments of the fifth and sixth embodiments include, but are not limited to, bis(3-triethoxysilylpropyl) tetrasulfide, bis(2-triethoxysilylethyl) tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropylbenzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in certain embodiments of fifth and sixth embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain embodiments of the fifth and sixth embodiments disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1-propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propylethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT™ silane (3-octanoylthio-1-propyltriethoxysilane), commercially available from Momentive Performance Materials Inc. of Albany, N.Y.

Non-limiting examples of pre-treated silicas (i.e., silicas that have been pre-surface treated with a silane) suitable for use in certain embodiments of the fifth and sixth embodiments disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane bis(triethoxysilylpropyl) polysulfide (Si69) and Ultrasil® VN3 silica. Coupsil 6508, Agilon 400™ silica from PPG Industries, Agilon 454® silica from PPG Industries, and 458® silica from PPG Industries. In those embodiments where the silica comprises a pre-treated silica, the pre-treated silica is used in an amount as previously disclosed for the silica filler (i.e., about 5 to about 200 phr, etc.).

When a silica coupling agent is utilized in an embodiment of the fifth and sixth embodiments, the amount used may vary. In certain embodiments of the fifth and sixth embodiments, the rubber compositions do not contain any silica coupling agent. In other embodiments of the fifth and sixth embodiments, the silica coupling agent is present in an amount sufficient to provide a ratio of the total amount of silica coupling agent to silica filler of about 0.1:100 to about 1:5 (i.e., about 0.1 to about 20 parts by weight per 100 parts of silica), including 0.1:100 to 1:5, about 1:100 to about 1:10, 1:100 to 1:10, about 1:100 to about 1:20, 1:100 to 1:20, about 1:100 to about 1:25, and 1:100 to 1:25 as well as about 1:100 to about 0:100 and 1:100 to 0:100. In certain embodiments according to the fifth and sixth embodiments, the rubber composition comprises about 0.1 to about 10 phr silica coupling agent, including 0.1 to 10 phr, about 0.1 to about 5 phr, 0.1 to 5 phr, about 0.1 to about 3 phr, and 0.1 to 3 phr.

Carbon Black

As discussed above, in certain embodiments of the fifth and sixth embodiments the at least one reinforcing filler which comprises carbon black. One or more than one carbon black reinforcing filler can be utilized. As discussed in more detail below, most carbon blacks are commonly understood to be reinforcing fillers. In certain embodiments of the fifth and sixth embodiments, the rubber composition comprises carbon black in an amount of from zero to about 50% by weight of the total reinforcing filler, including zero to 50%, about 5% to about 30%, 5% to 30%, from about 5% to about 20%, 5% to 20%, about 10% to about 30%, 10% to 30%, about 10% to about 20%, and 10% to 20% by weight of the total reinforcing filler. In certain embodiments of the fifth and sixth embodiments, the carbon black comprises no more than about 30% by weight (including no more than 30% by weight) of the total reinforcing filler in the rubber composition. In certain embodiments of the fifth and sixth embodiments, the rubber composition comprises about 5 to about 100 phr (including 5 to 100 phr) of one or more carbon blacks.

Generally, suitable carbon blacks for use as a reinforcing filler in the rubber composition of certain embodiments of the fifth and sixth embodiments include any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used herein for carbon blacks are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the fifth and sixth embodiments, the rubber composition includes a mixture of two or more of the foregoing blacks. Typical suitable carbon blacks for use in certain embodiments of the fifth and sixth embodiments are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

Other Reinforcing Fillers

As discussed above, in certain embodiments of the fifth and sixth embodiments, the at least one reinforcing filler comprises a reinforcing filler other than carbon black or silica (i.e., an additional reinforcing filler). One or more than one additional reinforcing filler may be utilized. In certain embodiments of the fifth and sixth embodiments, the rubber composition comprises at least reinforcing carbon black and at least one additional reinforcing filler; at least one reinforcing silica filler and at least one additional reinforcing filler; or at least one reinforcing carbon black, at least one reinforcing silica filler, and at least one additional reinforcing filler.

Suitable reinforcing fillers other than carbon black or silica for use in the rubber composition of certain embodiments of the fifth and sixth embodiments are well known. Non-limiting examples of suitable additional reinforcing fillers for use in the rubber compositions of certain embodiments of the fifth and sixth embodiments include, but are not limited to, alumina, aluminum hydroxide, clay (reinforcing grades), magnesium hydroxide, boron nitride, aluminum nitride, titanium dioxide, reinforcing zinc oxide, and combinations thereof.

Non-Reinforcing Fillers

In certain embodiments of the fifth and sixth embodiments, the rubber composition further comprises at least one of the following non-reinforcing fillers: clay (non-reinforcing grades), graphite, magnesium dioxide, aluminum oxide, starch, boron nitride (non-reinforcing grades), silicon nitride, aluminum nitride (non-reinforcing grades), calcium silicate, and silicon carbide. The term "non-reinforcing filler" is used to refer to a particulate material that has a nitrogen absorption specific surface area ($N_2SA$) of less than about 20 $m^2/g$ (including less than 20 $m^2/g$), and in certain embodiments less than about 10 $m^2/g$ (including less than 10 $m^2/g$). The $N_2SA$ surface area of a particulate material can be determined according to various standard methods including ASTM D6556. In certain embodiments, the term "non-reinforcing filler" is alternatively or additionally used to refer to a particulate material that has a particle size of greater than about 1000 nm (including greater than 1000 nm).

Cure Package

In certain embodiments of the fifth and sixth embodiments disclosed herein, the rubber composition includes (further comprises) a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments of the fifth and sixth embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Various vulcanizing inhibitors and anti-scorching agents are known in the art and can be selected by one skilled in the art based on the vulcanizate properties desired.

Examples of suitable types of vulcanizing agents for use in certain embodiments of the fifth and sixth embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in certain embodiments of the fifth and sixth embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Other Ingredients

Other ingredients that may be employed in certain embodiments (i.e., are optional) of the fifth and sixth embodiments are known to those of skill in the art and include oils (processing and extender), waxes, processing aids, antioxidants, tackifying resins, reinforcing resins, peptizers, and the components of a cure package.

In certain embodiments of the fifth and sixth embodiments, the rubber composition comprises about 5 to about 60 phr (e.g., 5, 10, 15, 20, 25, 30, 35, 40, 45, 50, 55, or 60 phr), 5 to 60 phr, 5 to 20 phr, about 25 to about 60 phr, 25 to 60 phr, or 30 to 50 phr of at least one resin; in certain such embodiments the at least one resin is a plasticizing resin. As used herein, the term plasticizing resin refers to a compound that is solid at room temperature (23° C.) and is miscible in the rubber composition at the amount used which is usually at least 5 phr. Generally, the plasticizing resin will act as a diluting agent and can be contrasted with tackifying resins which are generally immiscible and may migrate to the surface of a rubber composition providing tack. In certain embodiments of the fifth and sixth embodiments, wherein a plasticizing resin is utilized, it comprises a hydrocarbon resin and may be aliphatic type, aromatic type or aliphatic/aromatic type depending on the monomers contained therein. Examples of suitable plasticizing resins for use in the rubber compositions of the fifth and sixth embodiments include, but are not limited to, cyclopentadiene (abbreviated to CPD) or dicyclopentadiene (abbreviated to DCPD) homopolymer or copolymer resins, terpene homopolymer or copolymer resins and C5 fraction homopolymer or copolymer resins. Such resins may be used, for example, individually or in combination. In certain embodiments of the fifth and sixth embodiments, a plasticizing resin is used which meets at least one of the following: a Tg greater than 30° C. (preferably greater than 40° C. and/or no more than 120° C. or no more than 100° C.), a number average molecular weight (Mn) of between 400 and 2000 grams/mole (preferably 500-2000 grams/mole), and a polydispersity index (PI) of less than 3 (preferably less than 2), wherein PI=Mw/Mn and Mw is the weight-average molecular weight of the resin. Tg of the resin can be measured by DSC (Differential Scanning calorimetry) according to ASTM D3418 (1999). Mw, Mn and PI of the resin may be determined by size exclusion chromatography (SEC), using THF, 35° C.; concentration 1 g/1; flow rate 1 milliliters/min; solution filtered through a filter with a porosity of 0.45 µm before injection; Moore calibration with styrene-butadiene standards; set of 3 "Waters" columns in series ("Styragel" HR4E, HR1 and HR0.5); detection by differential refractometer ("Waters 2410") and its associated operating software ("Waters Empower").

In certain embodiments of the fifth and sixth embodiments, the rubber composition comprises tackifying resin in an amount of 1 to 15 phr, 1 to 10 phr, or 1 to 5 phr. Exemplary tackifying resins include but are not limited to: rosin and its derivatives, hydrocarbon resins, and phenol-formaldehyde resins. One or more than one type as well as one or more than one of tackifying resin may be utilized in certain embodiments of the fifth and sixth embodiments. The tackifying resin will generally be solid (or semi-solid) at room temperature (23° C.) as opposed to being liquid (such as oils) at room temperature. Exemplary types of rosin-type resins include, but are not limited to, gum rosin, wood rosin, tall oil rosin, rosin esters, and combinations thereof. Exemplary types of hydrocarbon resins include, but are not limited to, cyclopentadiene or dicyclopentadiene homopolymer or copolymer resins; terpene/phenol homopolymer or copolymer resins; C5 or C9 fraction homopolymer or copolymer resins; alpha-methylstyrene homopolymer or copolymer resins, and combinations thereof. Exemplary types of phenol-formaldehyde resins include, but are not limited to, those containing alkyl phenols.

Various antioxidants are known to those of skill in the art and may be utilized in the rubber compositions of certain embodiments of the fifth and sixth embodiments; these include but are not limited to certain waxes, phenolic antioxidants, amine phenol antioxidants, hydroquinone antioxidants, alkyldiamine antioxidants, and amine compound antioxidants such as N-phenyl-N'-isopropyl-p-phenylenediamine (IPPD), or N-(1,3-dimethylbutyl)-N'-phenyl-phenylenediamine (6PPD). One or more than one type as well as one or more than one of each type may be utilized in certain embodiments of the fifth and sixth embodiments. In certain embodiments of the fifth and sixth embodiments, the total amount of antioxidant(s) used is 1 to 5 phr.

Various types of processing and extender oils may be utilized, including, but not limited to aromatic, naphthenic, and low PCA oils (petroleum-sourced or plant-sourced). Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable petroleum-sourced low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES 5201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil (including high oleic sunflower oil), safflower oil, corn oil, linseed oil, cotton seed oil, rapeseed oil, cashew oil, sesame oil, camellia oil, jojoba oil, macadamia nut oil, coconut oil, and palm oil. The foregoing processing oils can be used as an extender oil, i.e., to prepare an oil-extended polymer or copolymer or as a processing or free oil. Generally, for most uses of the rubber compositions in tire components the total amount of oil used (processing oil and any extender oil) in the rubber compositions disclosed herein ranges from about 1 to about 70 phr, including 1 to 70 phr (e.g., 1, 5, 10, 15, 20, 25, 30, 35, 40, 45, 50, 55, 60, 65, or 70 phr), about 2 to about 60 phr, 2 to 60 phr, about 3 to about 50 phr, and 3 to 50 phr. However, in certain applications, the total amount of oil used (processing oil and any extender oil) in the rubber compositions and methods disclosed herein is much higher and ranges up to about 175 phr (e.g., 50, 60, 70, 80, 90, 100, 110, 120, 130, 140, 150, 160, 170 or 175 phr), including up to 175 phr, up to about 150 phr, up to 150 phr, up to about 100 phr, and up to 100 phr.

Preparing the Rubber Compositions

The particular steps involved in preparing rubber compositions according to the fifth and sixth embodiments disclosed herein are generally those of conventionally practiced methods comprising mixing the ingredients in at least one non-productive master-batch stage and a final productive mixing stage. In certain embodiments of the fifth and sixth embodiments, the rubber composition is prepared by combining the ingredients for the rubber composition (as disclosed above) by methods known in the art, such as, for example, by kneading the ingredients together in a Banbury mixer or on a milled roll. Such methods generally include at least one non-productive master-batch mixing stage and a final productive mixing stage. The term non-productive master-batch stage is known to those of skill in the art and generally understood to be a mixing stage (or stages) where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the fifth and sixth embodiments, the rubber composition is prepared by a process comprising more than one non-productive master-batch mixing stage.

In certain embodiments of the fifth and sixth embodiments, the master-batch mixing stage includes at least one of tandem mixing or intermeshing mixing. Tandem mixing can be understood as including the use of a mixer with two mixing chambers with each chamber having a set of mixing rotors; generally, the two mixing chambers are stacked together with the upper mixing being the primary mixer and the lower mixer accepting a batch from the upper or primary mixer. In certain embodiments, the primary mixer utilizes intermeshing rotors and in other embodiments the primary mixer utilizes tangential rotors. Preferably, the lower mixer utilizes intermeshing rotors. Intermeshing mixing can be understood as including the use of a mixer with intermeshing rotors. Intermeshing rotors refers to a set of rotors where the major diameter of one rotor in a set interacts with the minor diameter of the opposing rotor in the set such that the rotors intermesh with each other. Intermeshing rotors must be driven at an even speed because of the interaction between the rotors. In contrast to intermeshing rotors, tangential rotors refers to a set of rotors where each rotor turns independently of the other in a cavity that may be referred to as a side. Generally, a mixer with tangential rotors will include a ram whereas a ram is not necessary in a mixer with intermeshing rotors.

Generally, the rubbers (or polymers) and at least one reinforcing filler (as well as any silane coupling agent and oil) will be added in a non-productive or master-batch mixing stage or stages. Generally, at least the vulcanizing agent component and the vulcanizing accelerator component of a cure package will be added in a final or productive mixing stage.

In certain embodiments of the fifth and sixth embodiment, the rubber composition is prepared using at least one non-productive master batch mixing stage conducted at a temperature of about 130° C. to about 200° C. In certain embodiments of the fifth and sixth embodiments, the rubber composition is prepared using a final productive mixing stage conducted at a temperature below the vulcanization temperature in order to avoid unwanted pre-cure of the rubber composition. Therefore, the temperature of the productive or final mixing stage generally should not exceed about 120° C. and is typically about 40° C. to about 120° C., or about 60° C. to about 110° C. and, especially, about 75° C. to about 100° C. In certain embodiments of the fifth and sixth embodiments, the rubber composition is prepared according to a method that includes at least one non-productive mixing stage and at least one productive mixing stage. Where a rubber composition of the fifth or sixth embodiment includes fillers other than (or in addition to) carbon black, a separate re-mill stage may optionally be employed for separate addition of a portion or all of the other fillers. This stage often is performed at temperatures similar to, although often slightly lower than, those employed in the masterbatch stage, i.e., ramping from about 90° C. to a drop temperature of about 150° C.

Tires and Tire Treads

Additional embodiments (i.e., a seventh embodiment and an eighth embodiment) can also be considered to be disclosed herein. The seventh and eighth embodiments are directed to a tire component comprising the rubber composition of the fifth or sixth embodiment. As mentioned above, the rubber compositions of the fifth embodiment utilize the coupled polymer product of the second embodiment or the coupled polymer product resulting from the process of the first embodiment and the rubber compositions of the sixth embodiment utilize a coupled polymer product of the fourth embodiment or the coupled polymer product resulting from the process of the third embodiment. Thus, the seventh and eighth embodiments disclosed herein should be understood to include coupled polymer product which varies according to the description provided herein for the first-sixth embodiments, as if those variations were fully repeated in this section. In certain embodiments of the seventh and eighth embodiments, the tire component comprises a tire tread.

Improved Properties

The use of the coupled polymer product of the second embodiment, the coupled polymer product of the fourth embodiment, the coupled polymer product resulting from the process of the first embodiment, or the coupled polymer product resulting from the process of the third embodiment, in a rubber composition (e.g., according to the fifth or sixth embodiments disclosed herein) may result in improved properties in that rubber composition. The improved properties may include one or more of rolling resistance, snow or ice traction, wet traction, or bound rubber. Percentage reductions or increases can be calculated by comparing the value for a rubber composition using a coupled polymer product according to the present disclosure to the value for a control rubber composition which replaces the coupled polymer product with a non-functionalized polymer (as described in more detail in the Examples section herein), but otherwise contains the same ingredients.

In certain embodiments, the use of the coupled polymer product according to any of the first-fourth embodiments (e.g., as in the fifth or sixth embodiments) results in an improvement in rolling resistance, such as evidenced by a reduction in the measurement of tan 6 at ° C. of at least 10% (e.g., 10%, 15%, 20%, 25%, 30%, 35%, 40%, 45%, 50% or more), at least 20%, at least 30%, at least 40%, at least 50%, 10-50%, 10-40%, 20-50% or 20-40%. As a non-limiting example, a reduction in tan δ at 60° C. of 10% would be evidenced by an index value of 90 (according to the index value calculations described further below).

In certain embodiments, the use of the coupled polymer product according to any of the first-fourth embodiments (e.g., as in the fifth or sixth embodiments) results in an improvement in rolling resistance (such as evidenced by a reduction in the measurement of tan δ at 60° C.), as previously discussed, which is combined with an improvement in snow or ice traction (such as evidenced by a reduction in the measurement of G* at −20° C.) of at least 10% (e.g., 10%, 15%, 20%, 25%, 30%, 35%, 40%, 45%, 50%, 55%, 60%, or more), at least 20%, at least 30%, at least 40%, at least 50%, at least 60%, at least 70%, 10-60%, 10-50%, 20-50% or 20-40%. As a non-limiting example, a reduction in G* at −20° C. of 40% would be evidenced by an index value of 60.

In certain embodiments, the use of the coupled polymer product according to any of the first-fourth embodiments (e.g., as in the fifth or sixth embodiments) results in an improvement in rolling resistance (such as evidenced by a reduction in the measurement of tan δ at 60° C.), as previously discussed, which is combined with an improvement in wet traction (such as evidenced by an increase in the measurement of tan δ at 0° C.) of at least 5%, at least 10%, at least 15% (e.g., 5%, 10%, 15%, or more), 5-20%, or 5-15%. In certain embodiments, the wet traction is not improved (e.g., tan δ at 0° C. does not increase), but any decrease in tan δ at 0° C. is limited to no more than 5%, no more than 10%, or no more than 15% as compared to a control composition. As a non-limiting example, a decrease in tan δ at 0° C. of 5% would be evidenced an index value of 95. In certain embodiments, the foregoing increase or limited decrease in tan δ at 0° C. is not only combined with the foregoing improvement in rolling resistance but also with the foregoing improvement in ice or snow traction.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that functionalizing compounds (i.e., compounds according to formula (II) and (III)) other than and in differing amounts than utilized in the Examples can be utilized, that vinyl group-functionalized aminosilane compounds (i.e., compounds according to formula I) other than and in differing amounts than utilized in the Examples can be utilized, that the particular coupled polymer product used in the Examples can be utilized in different amounts and/or with rubbers, fillers, and other ingredients which differ in amount, composition, or both from those used in the examples (i.e., as fully disclosed in the preceding paragraphs); and that a coupled polymer product which differs in type, amount or both can be utilized with the rubbers, fillers, and other ingredients used in the examples as well as rubbers, fillers, and other ingredients which different in amount, composition, or both from those used in the examples (i.e., as fully disclosed in the preceding paragraphs).

As explained in more detail below, various polymers were prepared, with certain polymers utilizing a compound of formula (I) and a compound of formula (II) and others utilizing a compound of formula (I) and a compound of formula (III). Examples 1, 5 and 15 can be considered controls since the polymers in these examples were prepared without any compound corresponding to formulas (I), (II), or (III). Examples 2, 4, 11 utilize a compound of formula (I) and a compound of formula (III). Examples 3, 6-10, 12-14, and 16-17 utilize a compound of formula (I) and a compound of formula (II).

Example 1: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was then charged with 3.55 milliliters of n-butyllithium (1.6 Molar in hexane) in 20 milliliters of hexane, followed by 1.45 milliliters of 2,2-bis(2'-tetrahydrofuryl) propane (1.6 Molar in hexane) in 20 milliliters of hexane, and the reactor jacket was heated to 50° C. After 34 minutes, the batch temperature peaked at 68.6° C. After an additional 60 minutes, the polymer cement was dropped into isopropanol containing butylated hydroxytoluene (BHT) and drum dried, resulting in the polymer of Example 1, having the properties listed below in Table 1. The polymer was targeted to have a styrene monomer content of 20% and 1,2-vinyl bond content in the butadiene portion of 55%. The polymer of Example 1 can be considered a control polymer.

TABLE 1

| Polymer # | Mn (grams/ mole) | Mw (grams/ mole) | Mp (grams/ mole) | Mw/Mn | % coupling | Tg (° C.) |
| --- | --- | --- | --- | --- | --- | --- |
| 1 | 110,566 | 113,885 | 113,316 | 1 | 0 | −40.2 |

Example 2: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was then charged with 3.55 milliliters of n-butyllithium (1.6 Molar in hexane) in 20 milliliters of hexane, followed by 1.45 milliliters of 2,2-bis(2'-tetrahydrofuryl) propane (1.6 Molar in hexane) in 20 milliliters of hexane, and the reactor jacket was heated to 50° C. After 33 minutes, the batch temperature peaked at 68.5° C. 2.83 milliliters of MASS (1.6 Molar in hexanes, 0.8 equivalents vs. Li) diluted in 20 milliliters of hexane was added right after the peak temperature (conversion percentage was about 80% at time of addition). After an additional 35 minutes, 1.40 milliliters of "neat" (3-triethoxysilyl)propylsuccinic anhydride (3.51 Molar, 0.9 equivalents vs. Li) diluted in 20 milliliters of hexane was added. After an additional 30 minutes, 0.65 milliliters of "neat" 3-isocyanopropyltrimethoxysilane (5.22 Molar, 0.6 equivalents vs. Li) diluted in 20 milliliters of hexane was added. After an additional 35 minutes, the polymer cement was dropped into isopropanol containing butylated hydroxytoluene (BHT) and drum dried, resulting in the polymer of Example 2, having the properties listed below in Table 2. The polymer was targeted to have a styrene monomer content of 20% and 1,2-vinyl bond content in the butadiene portion of 55%.

TABLE 2

| Polymer # | Mn (grams/mole) | Mw (grams/mole) | Mp (grams/mole) | Mw/Mn | % coupling | Tg (° C.) |
|---|---|---|---|---|---|---|
| 2 | 234,876 | 442,755 | 123,226 | 2 | 72.3 | −39.7 |

Example 3: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was with charged 3.55 milliliters of n-butyl-lithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 33 minutes, the batch temperature peaked at 69.3° C. 2.83 milliliters of MASS (1.6 Molar in hexanes, 0.8 equivalents vs. Li) diluted in 20 milliliters of hexane was added right after the peak temperature (conversion percentage was about 80% at time of addition). After an additional 40 minutes, 0.19 milliliters of "neat" 2-cyanoethyltriethoxysilane (4.5 Molar, 0.15 equivalents vs. Li) diluted in 20 milliliters of hexane was added. After an additional 40 minutes, 0.53 milliliters of "neat" 2-(3,4-epoxycyclohexyl)ethyltrimethoxysilane (4.23 Molar, 0.4 equivalents vs. Li) diluted in 20 milliliters of hexane was added. After an additional 35 minutes, the polymer cement was dropped into isopropanol containing butylated hydroxytoluene (BHT) and drum dried, resulting in the polymer of 3, having the properties listed below in Table 3. The polymer also had a styrene monomer content of 21 and 1,2-vinyl bond content in the butadiene portion of 37%.

TABLE 3

| Polymer # | Mn (grams/mole) | Mw (grams/mole) | Mp (grams/mole) | Mw/Mn | % coupling | Tg (° C.) |
|---|---|---|---|---|---|---|
| 3 | 232,982 | 425,294 | 111,816 | 1.8 | 72.2 | −41.8 |

Example 4: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was then charged with 3.55 milliliters of n-butyl-lithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 34 minutes, the batch temperature peaked at 69.6° C. 2.0 milliliters of MASS (1.6 Molar in hexanes, 0.56 equivalents vs. Li) diluted in 20 milliliters of hexane was added right after the peak temperature (conversion percentage was about 80% at time of addition). After an additional 40 minutes, 0.19 milliliters of "neat" (3-triethoxysilyl)propylsuccinic anhydride (3.51 Molar, 0.12 equivalents vs. Li) diluted in 20 milliliters of hexane was added. After an additional 30 minutes, 0.58 milliliters of "neat" (3-glycidoxypropy)methyldiethoxysilane (3.94 Molar, 0.4 equivalents vs. Li) diluted in 20 milliliters of hexane was added. After an additional 35 minutes, the polymer cement was dropped into isopropanol containing butylated hydroxytoluene (BHT) and drum dried, resulting in the polymer of Example 4, having the properties listed below in Table 4. The polymer was targeted to have a styrene monomer content of 20 and 1,2-vinyl bond content in the butadiene portion of 55%.

TABLE 4

| Polymer # | Mn (grams/mole) | Mw (grams/mole) | Mp (grams/mole) | Mw/Mn | % coupling | Tg (° C.) |
|---|---|---|---|---|---|---|
| 4 | 257,327 | 518,826 | 118,200 | 2.0 | 72.3 | −42.8 |

Example 5: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was then charged with 3.55 milliliters of n-butyl-lithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 34 minutes, the batch temperature peaked at 68.6° C. After an additional 60 minutes, the polymer cement was dropped into isopropanol containing butylated hydroxytoluene (BHT) and drum dried, resulting in the polymer of Example 5, having the properties listed below in Table 5. The polymer was targeted to have a styrene monomer content of 20 and 1,2-vinyl bond content in the butadiene portion of 55%. The polymer of Example 5 can be considered a control polymer.

TABLE 5

| Polymer # | Mn (grams/mole) | Mw (grams/mole) | Mp (grams/mole) | Mw/Mn | % coupling | Tg (° C.) |
|---|---|---|---|---|---|---|
| 5 | 106,969 | 111,558 | 110,775 | 1.0 | 0.0 | −32.2 |

Example 6: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was then charged with 3.55 milliliters of n-butyl-lithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 30 minutes, the batch temperature peaked at 69.1° C. 1.4 milliliters of MASS (1.6 Molar in hexanes, 0.4 equivalents vs. Li) diluted in 20 milliliters of hexane was added right after the peak temperature (conversion percentage was about 80% at time of addition). After an additional 40 minutes, 0.19 milliliters of "neat" 2-cyanoethyltriethoxysilane (4.5 Molar, 0.15 equivalents vs. Li) diluted in 20 milliliters of hexane was added. After an additional 30 minutes, 0.53 milliliters of "neat" 2-(3,4-epoxycyclohexyl)ethyltrimethoxysilane (4.32 Molar, 0.4 equivalents vs. Li) diluted in 20 milliliters of hexane was added. After an additional 35 minutes, the polymer cement was dropped into isopropanol containing butylated hydroxytoluene (BHT) and drum dried, resulting in the polymer of Example 6, having the properties listed below in Table 6. The polymer was targeted to have a styrene monomer content of 20 and 1,2-vinyl bond content in the butadiene portion of 55%.

Example 7: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was then charged with 3.55 milliliters of n-butyl-lithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 30 minutes, the batch temperature peaked at 69.1° C. 1.4 milliliters of MASS (1.6 Molar in hexanes, 0.4 equivalents vs. Li) diluted in 20 milliliters of hexane was added right after the peak temperature (conversion percentage was about 80% at time of addition). After an additional 40 minutes, 0.19 milliliters of "neat" 2-cyanoethyltriethoxysilane (4.5 Molar, 0.15 equivalents vs. Li) diluted in 20 milliliters of hexane was added. After an additional 30 minutes, 2.27 milliliters of 3-(N,N-bis(trimethylsilyl)aminopropyl)methyldiethoxysilane, (1 Molar, 0.4 equivalents vs. Li) diluted in 20 milliliters of hexane was added. After an additional 35 minutes, the polymer cement was dropped into isopropanol containing butylated hydroxytoluene (BHT) and drum dried, resulting in the polymer of Example 7, having the properties listed below in Table 6. The polymer was targeted to have a styrene monomer content of 20 and 1,2-vinyl bond content in the butadiene portion of 55%.

Example 8: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was then charged with 3.55 milliliters of n-butyllithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 30 minutes, the batch temperature peaked at 69.1° C. 1.4 milliliters of MASS (1.6 Molar in hexanes, 0.4 equivalents vs. Li) diluted in 20 milliliters of hexane was added right after the peak temperature (conversion percentage was about 80% at time of addition). After an additional 40 minutes, 0.19 milliliters of "neat" 2-cyanoethyltriethoxysilane (4.5 Molar, 0.15 equivalents vs. Li) diluted in 20 milliliters of hexane was added. After an additional 30 minutes, 0.76 milliliters of "neat" 3-(1,3-dimethylbutylidene)aminopropyltriethoxysilane (3.0 Molar, 0.4 equivalents vs. Li) diluted in 20 milliliters of hexane was added. After an additional 35 minutes, the polymer cement was dropped into isopropanol containing butylated hydroxytoluene (BHT) and drum dried, resulting in the polymer of Example 8, having the properties listed below in Table 6. The polymer was targeted to have a styrene monomer content of 20 and 1,2-vinyl bond content in the butadiene portion of 55%.

Example 9: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was then charged with 3.55 milliliters of n-butyllithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 30 minutes, the batch temperature peaked at 69.1° C. 1.4 milliliters of MASS (1.6 Molar in hexanes, 0.4 equivalents vs. Li) diluted in 20 milliliters of hexane was added right after the peak temperature (conversion percentage was about 80% at time of addition). After an additional 40 minutes, 0.19 milliliters of "neat" 2-cyanoethyltriethoxysilane (4.5 Molar, 0.15 equivalents vs. Li) diluted in 20 milliliters of hexane was added. After an additional 30 minutes, 1.54 milliliters of "neat" hexamethylcyclotrisiloxane (1.48 Molar, 0.4 equivalents vs. Li) diluted in 20 milliliters of hexane was added. After an additional 35 minutes, the polymer cement was dropped into isopropanol containing butylated hydroxytoluene (BHT) and drum dried, resulting in the polymer of Example 9, having the properties listed below in Table 6. The polymer was targeted to have a styrene monomer content of 20 and 1,2-vinyl bond content in the butadiene portion of 55%.

TABLE 6

| Polymer # | Mn (grams/mole) | Mw (grams/mole) | Mp (grams/mole) | Mw/Mn | % coupling | Tg (° C.) |
|---|---|---|---|---|---|---|
| 6 | 287,067 | 485,327 | 371,433 | 1.7 | 82.7 | −37.4 |
| 7 | 267,690 | 417,660 | 374,262 | 1.6 | 79.5 | −36.6 |
| 8 | 280,171 | 452,905 | 374,262 | 1.6 | 81.6 | −38.2 |
| 9 | 262,026 | 425,534 | 385,824 | 1.6 | 77.5 | −36.7 |

Example 10: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was then charged with 3.55 milliliters of n-butyllithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 28 minutes, the batch temperature peaked at 69.1° C. 1.06 milliliters of MASS (1.6 Molar in hexanes, 0.3 equivalents vs. Li) diluted in 20 milliliters of hexane was added right after the peak temperature (conversion percentage was about 80% at time of addition). After an additional 30 minutes, 0.22 milliliters of "neat" 2-cyanoethyltriethoxysilane (4.5 Molar, 0.18 equivalents vs. Li) diluted in 20 milliliters of hexane was added. After an additional 30 minutes, 0.46 milliliters of "neat" N-(3-triethoxysilylpropyl)-4,5-dihydroimidazole (3.66 Molar, 0.3 equivalents vs. Li) diluted in 20 milliliters of hexane was added. After an additional 35 minutes, the polymer cement was dropped into isopropanol containing butylated hydroxytoluene (BHT) and drum dried, resulting in the polymer of Example 10, having the properties listed below in Table 7. The polymer was targeted to have a styrene monomer content of 20 and 1,2-vinyl bond content in the butadiene portion of 55%.

Example 11: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was then charged with 3.55 milliliters of n-butyllithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 28 minutes, the batch temperature peaked at 68.4° C. 1.06 milliliters of MASS (1.6 Molar in hexanes, 0.3 equivalents vs. Li) diluted in 20 milliliters of hexane was added right after the peak temperature (conversion percentage was about 80% at time of addition). After an additional 30 minutes, 0.23 milliliters of "neat" (3-triethoxysilyl)propylsuccinic anhydride (3.51 Molar, 0.14 equivalents vs. Li) diluted in 20 milliliters of hexane was added. After an additional 30 minutes, 0.46 milliliters of "neat" N-(3-triethoxysilylpropyl)-4,5-dihydroimidazole (3.66 Molar, 0.3 equivalents vs. Li) diluted in 20 milliliters of hexane was added. After an additional 35 minutes, the polymer cement was dropped into isopropanol containing butylated hydroxytoluene (BHT) and drum dried, resulting in the polymer of Example 11, having the properties listed below in Table 7. The polymer was targeted to have a styrene monomer content of 20 and 1,2-vinyl bond content in the butadiene portion of 55%.

TABLE 7

| Polymer # | Mn (grams/mole) | Mw (grams/mole) | Mp (grams/mole) | Mw/Mn | % coupling | Tg (° C.) |
|---|---|---|---|---|---|---|
| 10 | 223,556 | 358,884 | 347,033 | 1.6 | 78.0 | −36.4 |
| 11 | 240,266 | 399,294 | 388,778 | 1.7 | 76.1 | −35.6 |

Example 12: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was then charged with 3.55 milliliters of n-butyl-lithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 29 minutes, the batch temperature peaked at 70.3° C. 1.06 milliliters of MASS (1.6 Molar in hexanes, 0.3 equivalents vs. Li) diluted in 20 milliliters of hexane was added right after the peak temperature (conversion percentage was about 80% at time of addition). After an additional 30 minutes, 0.18 milliliters of "neat" 3-cyanopropyltrimethoxysilane (5.24 Molar, 0.18 equivalents vs. Li) diluted in 20 milliliters of hexane was added. After an additional 30 minutes, 0.46 milliliters of "neat" N-(3-triethoxysilylpropyl)-4,5-dihydroimidazole (3.66 Molar, 0.3 equivalents vs. Li) diluted in 20 milliliters of hexane was added. After an additional 35 minutes, the polymer cement was dropped into isopropanol containing butylated hydroxytoluene (BHT) and drum dried, resulting in the polymer of Example 12, having the properties listed below in Table 8. The polymer was targeted to have a styrene monomer content of 20 and 1,2-vinyl bond content in the butadiene portion of 55%.

Example 13: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was then charged with 3.55 milliliters of n-butyl-lithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 27 minutes, the batch temperature peaked at 69.0° C. 1.42 milliliters of MASS (1.6 Molar in hexanes, 0.4 equivalents vs. Li) diluted in 20 milliliters of hexane was added right after the peak temperature (conversion percentage was about 80% at time of addition). After an additional 45 minutes, 0.22 milliliters of "neat" 2-cyanoethyltriethoxysilane (4.5 Molar, 0.18 equivalents vs. Li) diluted in 20 milliliters of hexane was added. After an additional 30 minutes, 0.46 milliliters of "neat" N-(3-triethoxysilylpropyl)-4,5-dihydroimidazole (3.66 Molar, 0.3 equivalents vs. Li) diluted in 20 milliliters of hexane was added. After an additional 35 minutes, the polymer cement was dropped into isopropanol containing butylated hydroxytoluene (BHT) and drum dried, resulting in the polymer of Example 13, having the properties listed below in Table 8. The polymer was targeted to have a styrene monomer content of 20 and 1,2-vinyl bond content in the butadiene portion of 55%.

Example 14: To a two gallon $N_2$ purged reactor equipped with a stirrer was added 1.49 kilograms of hexane, 0.41 kilograms of styrene (33.0 weight % in hexane), and 2.53 kilograms of 1,3-butadiene (21.9 weight % in hexane). The reactor was then charged with 3.55 milliliters of n-butyl-lithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 28 minutes, the batch temperature peaked at 69.4° C. 1.77 milliliters of MASS (1.6 Molar in hexanes, 0.5 equivalents vs. Li) diluted in 20 milliliters of hexane was added right after the peak temperature (conversion percentage was about 80% at time of addition). After an additional 45 minutes, 0.22 milliliters of "neat" 2-cyanoethyltriethoxysilane (4.5 Molar, 0.18 equivalents vs. Li) diluted in 20 milliliters of hexane was added. After an additional 30 minutes, 0.46 milliliters of "neat" N-(3-triethoxysilylpropyl)-4,5-dihydroimidazole (3.66 Molar, 0.3 equivalents vs. Li) diluted in 20 milliliters of hexane was added. After an additional 35 minutes, the polymer cement was dropped into isopropanol containing butylated hydroxytoluene (BHT) and drum dried, resulting in the polymer of Example 14, having the properties listed below in Table 8. The polymer was targeted to have a styrene monomer content of 20 and 1,2-vinyl bond content in the butadiene portion of 55%.

TABLE 8

| Polymer # | Mn (grams/mole) | Mw (grams/mole) | Mp (grams/mole) | Mw/Mn | % coupling | Tg (° C.) |
|---|---|---|---|---|---|---|
| 12 | 262,374 | 477,241 | 121,003 | 1.8 | 75.4 | −34.3 |
| 13 | 286,774 | 516,162 | 391,101 | 1.8 | 81.2 | −32.9 |
| 14 | 291,446 | 560,218 | 391,101 | 1.9 | 80.6 | −34.9 |

Example 15: To a two gallon $N_2$ purged reactor equipped with a stirrer was added 1.43 kilograms of hexane, 0.20 kilograms of styrene (33.0 weight % in hexane), and 2.79 kilograms of 1,3-butadiene (21.9 weight % in hexane). The reactor was then charged with 6.8 milliliters of n-butyl-lithium (1.6 Molar in hexane) in 20 milliliters of hexane, followed by 1.25 milliliters of 2,2-bis(2'-tetrahydrofuryl)propane (1.6 Molar in hexane) in 20 milliliters of hexane, and the reactor jacket was heated to 50° C. The batch temperature was allowed to peak, and then after an additional 60 minutes, the polymer cement was dropped into isopropanol containing butylated hydroxytoluene (BHT) and drum dried, resulting in the polymer of Example 15. The polymer was targeted to have a styrene monomer content of 10 and 1,2-vinyl bond content in the butadiene portion of 40%. The polymer of Example 15 can be considered a control polymer.

Example 16: To a two gallon $N_2$ purged reactor equipped with a stirrer was added 1.43 kilograms of hexane, 0.20 kilograms of styrene (33.0 weight % in hexane), and 2.79 kilograms of 1,3-butadiene (21.9 weight % in hexane). The reactor was with charged 6.8 milliliters of n-butyl-lithium (1.6 Molar in hexane) in 20 milliliters of hexane, followed by 1.25 milliliters of 2,2-bis(2'-tetrahydrofuryl)propane (1.6 Molar in hexane) in 20 milliliters of hexane, and the reactor jacket was heated to 50° C. The batch temperature was allowed to peak, and then 3.4 milliliters of MASS (1.6 Molar in hexanes, 0.5 equivalents vs. Li) diluted in 20 milliliters of hexane was added right after the peak temperature (conversion percentage was about 80% at time of addition). After an additional 45 minutes, 0.39 milliliters of "neat" 2-cyanoethyltriethoxysilane (4.5 Molar, 0.16 equivalents vs. Li) diluted in 20 milliliters of hexane was added. After an additional 35 minutes, 0.88 milliliters of "neat" 2-(3,4-epoxycyclohexyl)ethyltrimethoxysilane (4.32 Molar, 0.35 equivalents vs. Li) diluted in 20 milliliters of hexane was added. After an additional 35 minutes, the polymer cement was dropped into isopropanol containing butylated hydroxytoluene (BHT) and drum dried, resulting in the polymer of Example 16. Although microstructure data for the polymer of Example 16 was not available, the target styrene monomer content was 10%, the target vinyl bond content in the butadiene portion was 40%, and the target Mw was 62,500 grams/mole.

Example 17: To a two gallon $N_2$ purged reactor equipped with a stirrer was added 1.43 kilograms of hexane, 0.20 kilograms of styrene (33.0 weight % in hexane), and 2.79 kilograms of 1,3-butadiene (21.9 weight % in hexane). The reactor was with charged 6.8 milliliters of n-butyl-lithium (1.6 Molar in hexane) in 20 milliliters of hexane, followed by 1.25 milliliters of 2,2-bis(2'-tetrahydrofuryl)propane (1.6 Molar in hexane) in 20 milliliters of hexane, and the reactor jacket was heated to 50° C. The batch temperature was allowed to peak, and then 3.4 milliliters of MASS (1.6 Molar in hexanes, 0.5 equivalents vs. Li) diluted in 20 milliliters of hexane was added right after the peak temperature (conversion percentage was about 80% at time of addition). After an additional 45 minutes, 0.39 milliliters of "neat" 2-cyanoethyltriethoxysilane (4.5 Molar, 0.16 equivalents vs. Li) diluted in 20 milliliters of hexane was added. After an additional 35 minutes, 1.04 milliliters of "neat" N-(3-triethoxysilylpropyl)-4,5-dihydroimidazole (3.66 Molar, 0.35 equivalents vs. Li) diluted in 20 milliliters of hexane was added. After an additional 35 minutes, the polymer cement was dropped into isopropanol containing butylated hydroxytoluene (BHT) and drum dried, resulting in the polymer of Example 17. Although microstructure data for the polymer of Example 17 was not available, the target styrene monomer content was 10%, the target vinyl bond content in the butadiene portion was 40%, and the target Mw was 62,500 grams/mole.

Rubber Compositions: Rubber compositions were prepared using 100 parts of one of the SBR copolymers prepared above (i.e., Examples 1-17), with certain rubber compositions containing carbon black as reinforcing filler and others containing silica as reinforcing filler. In all, 29 rubber compositions were prepared and they are numbered 100-128. Table 9 identifies whether a formulation contains carbon black or silica as well as the particular SBR copolymer used in preparing the rubber composition. The carbon black formulation and silica formulation of ingredients is shown in Table 10, where the amounts of ingredients are listed in phr. The mixing procedure for preparing the compositions are shown below in Tables 11 and 12 with Table 11 directed to the carbon black-containing Examples and Table 12 directed to the silica-containing Examples. Examples 101, 104, 110, 115, 118, 121, 125 and 128 are controls since they do not contain coupled polymer product according to the present disclosure.

TABLE 9

|  | 100 | 101 | 102 | 103 | 104 | 105 | 106 | 107 |
|---|---|---|---|---|---|---|---|---|
| SBR of Example . . . | 3 | 6 | 7 | 8 | 9 | 5 | 10 | 11 |
| Silica | No | No | No | No | No | No | No | No |
| Carbon Black | Yes | Yes | Yes | Yes | Yes | Yes | Yes | Yes |

|  | 108 | 109 | 110 | 111 | 112 | 113 | 114 | 115 |
|---|---|---|---|---|---|---|---|---|
| SBR of Example . . . | 5 | 2 | 1 | 3 | 1 | 4 | 6 | 7 |
| Silica | No | Yes | Yes | Yes | Yes | Yes | Yes | Yes |
| Carbon Black | Yes | No | No | No | No | No | No | No |

TABLE 9-continued

|  | 116 | 117 | 118 | 119 | 120 | 121 | 122 | 123 |
|---|---|---|---|---|---|---|---|---|
| SBR of Example . . . | 8 | 9 | 5 | 10 | 11 | 5 | 12 | 13 |
| Silica | Yes | Yes | Yes | Yes | Yes | Yes | Yes | Yes |
| Carbon Black | No | No | No | No | No | No | No | No |

|  | 124 | 125 | 126 | 127 | 128 |
|---|---|---|---|---|---|
| SBR of Example . . . | 14 | 5 | 16 | 17 | 15 |
| Silica | Yes | Yes | Yes | Yes | Yes |
| Carbon Black | No | No | No | No | No |

TABLE 10

| Master Batch | Carbon Black Formulation | Silica Formulation |
|---|---|---|
| SBR of Example . . . | 100 | 100 |
| Silica | 0 | 0 |
| Carbon black[1] | 50 | 50 |
| Wax | 2 | 2 |
| Oil | 10 | 10 |
| Stearic acid | 2 | 2 |
| 6PPD[2] | 0.95 | 0.95 |
| Re-mill | N/A | N/A |
| Final |  |  |
| Sulfur | 1.5 | 1.5 |
| Accelerators | 1.3 | 1.3 |
| Zinc oxide | 2.5 | 2.5 |

[1]N343 grade
[2]N-(1,3-dimethylbutyl)-N'-phenyl-phenylenediamine

TABLE 11

Mixing Parameters (Carbon Black Compositions)

| Stage | Time | Condition |
|---|---|---|
| Master Batch Stage (initial temp: 130-135° C., rotor rpm started at 60) | 0 seconds | Charge polymers |
|  | 30 seconds | Charge oil, carbon black filler and other master-batch ingredients except stearic acid |
|  | 2.5 minutes | Add stearic acid |
|  | 4.5 minutes | Increase rotor speed to 90 rpm |
|  |  | Drop based on max temperature of 165° C. or 5.5 minutes mixing (whichever comes first) |
| Final Batch Stage (initial temp: 65-70° C., rotor rpm at 45) | 0 seconds | Charge Master Batch |
|  | 0 seconds | Charge curatives |
|  |  | Drop based on max temperature of 100° C. or 2.5 minutes mixing (whichever comes first) |

TABLE 12

Mixing Parameters (Silica Compositions)

| Stage | Time | Condition |
|---|---|---|
| Master Batch Stage (initial temp: 135° C., rotor rpm started at 70) | 0 seconds 30 seconds | Charge polymers Charge oil, silica filler and other master-batch ingredients Drop based on max temperature of 165° C. or 5 minutes mixing (whichever comes first) |
| Remill Stage (initial temp: 135° C., rotor rpm at 70) | 0 seconds | Charge Master Batch Drop based on max temperature of 150° C. or 1.5 minutes mixing (whichever comes first) |
| Final Batch Stage (initial temp: 85° C., rotor rpm at 50) | 0 seconds 0 seconds | Charge Remill Charge curatives Drop based on max temperature of 110° C. or 1.8 minutes mixing (whichever comes first) |

Certain properties of the rubber compositions were measured and are reported below in Tables 13 and 14. Indexed values were calculated by dividing the value for a rubber composition according to the present disclosure (e.g., Examples 100) by the value for a control rubber composition (e.g., Example 101).

Tan δ at 60° C. and 0° C., G* at −20° C., and G' at 30° C. values were measuring using a temperature sweep test conducted with an Advanced Rheometric Expansion System (ARES) from TA Instruments. The test specimen had a rectangular geometry having a length of 47 mm, a thickness of 2 mm, and a width of 12.7 mm. The length of specimen between the grips on the test machine, i.e., the gap, was approximately 27 mm. The test was conducted using a frequency of 3.14 rad/sec. The temperature was started at −115° C. and increased to 100° C. The strain was 0.25% for the temperature range of −115° C. to −11° C., and 2% for the temperature range of −10° C. to 100° C. A rubber composition's tan δ at 60° C. is indicative of its rolling resistance when incorporated into a tire tread. A rubber composition's tan δ at 0° C. is indicative of its wet traction when incorporated into a tire tread. A rubber composition's G* at −20° C. is indicative of its ice or snow traction when incorporated into a tire tread. A rubber composition's G' at 30° C. is indicative of its dry handling when incorporated into a tire tread.

The Mooney viscosities disclosed herein for the rubber compositions were determined at 130° C. using an Alpha Technologies Mooney viscometer with a large rotor, a one minute warm-up time, and a four minute running time, and, hence are referred to as Mooney$_{1+4}$ or ML$_{1+4}$. More specifically, the Mooney viscosity was measured by preheating a sample from each batch to 130° C. for one minute before the rotor started. The Mooney viscosity was recorded for each sample as the torque at four minutes after the rotor started. The Mooney viscosities disclosed herein for polymers were determined at 100° C., using a procedure that was otherwise as described above.

The bound rubber content test was used to determine the percent of polymer bound to filler particles in each rubber composition. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Rubber} = \frac{100\,(Wd - F)}{R}$$

where Wd is the weight of dried gel, F is the weight of filler in gel or solvent insoluble matter (same as weight of filler in original sample), and R is the weight of polymer in the original sample. The bound rubber percentage provides a means of measuring the interaction between the rubber (polymer) within a rubber composition and the filler, with relatively higher percentages of bound rubber indicating increased and beneficial interaction between the rubber (polymer) and filler.

The % coupling and Tg were measured as described above (i.e., by GPC and DSC, respectively).

TABLE 13

(Carbon Black Filled Compositions)

| Property | 100 | 101 | 102 | 103 | 104 | 105 | 106 | 107 | 108 |
|---|---|---|---|---|---|---|---|---|---|
| Polymer of Example . . . | 3 | 6 | 7 | 8 | 9 | 5 | 10 | 11 | 5 |
| Indexed ML$_{1+4}$ at 100° C.[1] | 405 | 520 | 492 | 522 | 471 | 100 | 490 | 459 | 100 |
| Indexed ML$_{1+4}$ at 130° C.[2] | 387 | 334 | 320 | 322 | 308 | 100 | 289 | 298 | 100 |
| Indexed Tan δ at 60° C.[2] | 61 | 64 | 64 | 63 | 65 | 100 | 67 | 71 | 100 |
| Indexed G* at −20° C. | 19 | 42 | 42 | 45 | 42 | 100 | 48 | 53 | 100 |
| Indexed G' at 30° C. | 67 | 66 | 63 | 65 | 69 | 100 | 67 | 72 | 100 |
| Indexed Tan δ at 0° C.[2] | 71 | 92 | 93 | 94 | 91 | 100 | 94 | 95 | 100 |
| Indexed bound rubber (%)[2] | 1385 | 965 | 905 | 977 | 867 | 100 | 520 | 511 | 100 |

[1]Refers to measurement on polymer
[2]Refers to measurement made on rubber composition When calculating the index values in Table 13, composition 105 was used as a control for composition 100; composition 105 was used as a control for compositions 101-104; and composition 108 was used as a control for compositions 106 and 107. The index values were calculated by dividing a measured value by a control value and multiplying the result by 100. As a non-limiting example, if the measured value was 100 and the control value was 50, the indexed value would be 200. Thus, an index value greater than 100 indicates an increase in the measured value as compared to the respective control value. As those of skill in the art will appreciate, certain properties are considered to be improved when their values increase (i.e., dry handling, wet traction, and bound rubber %) whereas other properties are considered to be improved when their values decrease (i.e., rolling resistance and snow or ice traction).

As can be seen from the data of Table 13 above, the use of the inventive polymers consistently results in a lower tan δ at 60° C. indicating that the use of those rubber compositions in tire treads would result in a tire with lower rolling resistance than use of either of the control rubber compositions. Moreover, the use of the inventive polymers also consistently results in a lower G* at −20 C which tends to indicate that the use of those rubber compositions in tire treads would result in a tire with improved snow or ice traction. Achieving an improvement in rolling resistance while also achieving an improvement in snow or ice traction is unexpected, since an improvement in rolling resistance is usually expected to result in worse snow or ice traction. Additionally, the use of the inventive polymers consistently results in a higher percentage of bound rubber, indicating better rubber-filler interaction in the rubber composition.

Rubber compositions having formulations 109-128 each contained 80 phr of silica. Properties of these rubber compositions are listed below in Tables 14-A, 14-B and 14-C.

TABLE 14-A (Silica Filled Compositions)

| Property | Rubber Composition | | | | |
|---|---|---|---|---|---|
| | 109 | 110 | 111 | 112 | 113 |
| Polymer of Example . . . | 2 | 1 | 3 | 1 | 4 |
| Indexed $ML_{1+4}$ at 100° C.[1] | 690 | 100 | 455 | 100 | 516 |
| Indexed $ML_{1+4}$ at 130° C.[2] | 235 | 100 | 205 | 100 | 235 |
| Indexed Tan δ at 60° C.[2] | 63 | 100 | 61 | 100 | 72 |
| Indexed G* at −20° C.[2] | 67 | 100 | 58 | 100 | 69 |
| Indexed G' at 30° C.[2] | 47 | 100 | 53 | 100 | 61 |
| Indexed Tan δ at 0° C.[2] | 116 | 100 | 100 | 100 | 112 |
| Indexed bound rubber (%)[2] | 243 | 100 | 243 | 100 | 201 |

[1]Refers to measurement on polymer
[2]Refers to measurement made on rubber composition When calculating the index values in Table 14-A, composition 110 was used as a control for composition 109; composition 112 was used as a control for composition 111; and composition 110 was used as a control for composition 113 (even though composition 110 was not mixed during the same order as composition 113). The index values were again calculated by dividing a measured value by a control value and multiplying the result by 100, as explained above.

As can be seen from the data of Table 14-A above, the use of the inventive polymers consistently results in a lower tan δ at 60° C. indicating that the use of those rubber compositions in tire treads would result in a tire with lower rolling resistance than use of either of the control rubber compositions. Moreover, the use of the inventive polymers also consistently results in a lower G* at −20 C which tends to indicate that the use of those rubber compositions in tire treads would result in a tire with improved snow or ice traction. Achieving an improvement in rolling resistance while also achieving an improvement in snow or ice traction is unexpected, since an improvement in rolling resistance is usually expected to result in worse snow or ice traction. Additionally, the use of the inventive polymers consistently results in a higher percentage of bound rubber, indicating better rubber-filler interaction in the rubber composition.

TABLE 14-B (Silica Filled Compositions)

| Property | Rubber Composition | | | | | | | |
|---|---|---|---|---|---|---|---|---|
| | 114 | 115 | 116 | 117 | 118 | 119 | 120 | 121 |
| Polymer of Example . . . | 6 | 7 | 8 | 9 | 5 | 10 | 11 | 5 |
| Indexed $ML_{1+4}$ at 100° C.[1] | 520 | 492 | 522 | 471 | 100 | 490 | 459 | 100 |
| Indexed $ML_{1+4}$ at 130° C.[2] | 305 | 284 | 311 | 284 | 100 | 203 | 240 | 100 |
| Indexed Tan δ at 60° C.[2] | 61 | 62 | 63 | 61 | 100 | 62 | 72 | 100 |
| Indexed G* at −20° C. | 47 | 50 | 51 | 47 | 100 | 51 | 55 | 100 |
| Indexed G' at 30° C.[2] | 44 | 43 | 45 | 51 | 100 | 51 | 76 | 100 |
| Indexed Tan δ at 0° C.[2] | 109 | 111 | 111 | 112 | 100 | 106 | 93 | 100 |
| Indexed bound rubber (%)[2] | 349 | 331 | 337 | 345 | 100 | 191 | 195 | 100 |

[1]Refers to measurement on polymer
[2]Refers to measurement made on rubber composition When calculating the index values in Table 14-B, composition 118 was used as a control for compositions 114-117; and composition 121 was used as a control for compositions 119 and 120. The index values were again calculated by dividing a measured value by a control value and multiplying the result by 100, as explained above.

As can be seen from the data of Table 14-B above, the use of the inventive polymers consistently results in a lower tan δ at 60° C. indicating that the use of those rubber compositions in tire treads would result in a tire with lower rolling resistance than use of either of the control rubber compositions. Moreover, the use of the inventive polymers also consistently results in a lower G* at −20 C which tends to indicate that the use of those rubber compositions in tire treads would result in a tire with improved snow or ice traction. Achieving an improvement in rolling resistance while also achieving an improvement in snow or ice traction is unexpected, since an improvement in rolling resistance is usually expected to result in worse snow or ice traction. Additionally, the use of the inventive polymers consistently results in a higher percentage of bound rubber, indicating better rubber-filler interaction in the rubber composition.

TABLE 14-C (Silica Filled Rubber Compositions)

| Property | Rubber Composition | | | | | | |
|---|---|---|---|---|---|---|---|
| | 122 | 123 | 124 | 125 | 126 | 127 | 128 |
| Polymer of Example... | 12 | 13 | 14 | 5 | 16 | 17 | 15 |
| Indexed $ML_{1+4}$ at 100° C.[1] | 479 | 493 | 488 | 100 | ** | ** | ** |
| Indexed $ML_{1+4}$ at 130° C.[2] | 234 | 255 | 247 | 100 | 324 | 343 | 100 |
| Indexed Tan δ at 60° C.[2] | 70 | 71 | 68 | 100 | 69 | 62 | 100 |
| Indexed G* at −20° C.[2] | 47 | 56 | 46 | 100 | 40 | 39 | 100 |
| Indexed G' at 30° C.[2] | 52 | 57 | 47 | 100 | 49 | 85 | 100 |
| Indexed Tan δ at 0° C.[2] | 104 | 105 | 107 | 100 | 85 | 83 | 100 |
| Indexed bound rubber (%)[2] | 250 | 266 | 272 | 100 | ** | ** | ** |

[1] Refers to measurement on polymer
[2] Refers to measurement made on rubber composition
** Data not available When calculating the index values in Table 14-C, composition 125 was used as a control for compositions 122-124; and composition 128 was used as a control for compositions 126 and 127. The index values were again calculated by dividing a measured value by a control value and multiplying the result by 100, as explained above.

As can be seen from the data of Table 14-C above, the use of the inventive polymers consistently results in a lower tan δ at 60° C. indicating that the use of those rubber compositions in tire treads would result in a tire with lower rolling resistance than use of either of the control rubber compositions. Moreover, the use of the inventive polymers also consistently results in a lower G* at −20 C which tends to indicate that the use of those rubber compositions in tire treads would result in a tire with improved snow or ice traction. Achieving an improvement in rolling resistance while also achieving an improvement in snow or ice traction is unexpected, since an improvement in rolling resistance is usually expected to result in worse snow or ice traction. Additionally, the use of the inventive polymers consistently results in a higher percentage of bound rubber, indicating better rubber-filler interaction in the rubber composition.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A coupled polymer product comprising:
polymer with up to a total of 5 polymer chains bonded directly to a functionalizing compound of formula II, wherein formula (II) is as follows:

$$NC-(Q^1)Si(X^1)(X^2)(X^3) \quad (II)$$

wherein Q is divalent and selected from $C_1$-$C_{12}$ divalent alkylene moieties or aromatic moieties, each X is a leaving group independently selected from halogens and alkoxy of $OR^6$ wherein each $R^6$ is independently selected from $C_1$-$C_{12}$ aliphatic hydrocarbyl, wherein the polymer chains comprise (a) at least one conjugated diene monomer optionally in combination with at least one vinyl aromatic monomer, and (b) at least one vinyl group-functionalized silane compound of formula (I) bonded within the polymer chain via its vinyl group, wherein formula (I) is as follows:

$$(H_2C=CH)-(A)-Si(R^1)(R^2)(R^3) \quad (I)$$

where A is divalent and selected from $C_6$-$C_{20}$ aromatic hydrocarbons optionally substituted with an aliphatic alkylene moiety to which the Si is bonded, each of $R^1$, $R^2$, and $R^3$ are independently selected from linear or branched $C_1$-$C_{12}$ hydrocarbyl and —$N(R^4)(R^5)$, with at least one of $R^1$, $R^2$ and $R^3$ selected from —$N(R^4)(R^5)$, wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring, and $R^1$ and $R^2$ are optionally bonded together into a ring comprising two nitrogen atoms, wherein the average number of vinyl group-functionalized aminosilane compound of formula (I) per polymer chain is about 0.1:1 to about 3:1, and up to 3 polymer chains are bonded to the Si of each compound of formula (II).

2. The coupled polymer product of claim 1, wherein the formula (I) compound is positioned 50 to 90% from the tail of the polymer chain.

3. The coupled polymer product of claim 1, wherein A is phenylene.

4. The coupled polymer product of claim 1, wherein the functionalizing compound of formula (II) has each of each of $X^1$, $X^2$ and $X^3$ as halogen.

5. The coupled polymer product of claim 1, wherein the functionalizing compound of formula (II) has each of $X^1$, $X^2$ and $X^3$ as $OR^6$.

6. The coupled polymer product of claim 1, wherein the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 3-methyl-1,3-pentadiene, 4-methyl-1,3-pentadiene, 2,4-hexadiene, and combinations thereof and any aromatic vinyl monomer present in (a) and (c) and is selected from the group consisting of styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol.

7. The coupled polymer product of claim 1, wherein the coupled polymer product has a head where an initiator residue lacking any nitrogen atom resides.

8. A process for preparing the coupled polymer product according to claim 1, the process comprising:
   a. polymerizing the at least one conjugated diene monomer and the at least one vinyl aromatic monomer when present using an anionic initiator to produce polymer chains with a living end;
   b. reacting the living end polymer chains from (a) with the vinyl group-functionalized aminosilane compound having formula (I),
      thereby producing a first intermediary product including polymer chains containing at least one vinyl group-functionalized aminosilane compound bonded to the polymer chain via its vinyl group;
   c. continuing polymerization of the at least one conjugated diene monomer and at least one vinyl aromatic monomer when present from (a) upon the polymer chains from (b),
      thereby producing a second intermediary product including polymer chains containing at least one vinyl group-functionalized aminosilane compound of formula (I) bonded within the polymer chain via its vinyl group, wherein the average number of vinyl group-functionalized aminosilane compound of formula (I) per polymer chain is about 0.1:1 to about 3:1;
   d. functionalizing the second intermediary product from (c) with the functionalizing compound having formula (II),
      thereby producing a final coupled polymer product including
      i. polymer chain ends functionalized with a compound of formula (II) via its NC-group,
      ii. polymer chain ends functionalized with a compound of formula (II) via the Si of formula II,
      iii. up to 3 polymer chains bonded to the Si of each compound of formula (II) from (i),
      iv. the polymer chains of the final coupled polymer product of (d) have an average number of vinyl group-functionalized aminosilane compound of formula (I) per polymer chain of about 0.1:1 to about 3:1, and
      v. 20 to 90% by weight of the final coupled polymer product comprises coupled polymer with 2 or more polymer chains bonded directly to each functionalized compound of formula (II).

9. The process of claim 8, wherein the ratio of the vinyl group-functionalized aminosilane of formula (I) to anionic initiator is 0.1:1 to 3:1.

10. The process of claim 8, wherein the anionic initiator used does not include any nitrogen atom.

11. A rubber composition comprising:
   a. 10-100 parts of the coupled polymer product of claim 1;
   b. 0-90 parts of at least one diene monomer-containing polymer selected from the group consisting of natural rubber, polyisoprene, polybutadiene rubber, styrene-butadiene rubber, styrene-butadiene-isoprene rubber, isoprene-butadiene rubber, and combinations thereof; and
   c. 5-200 phr of at least one reinforcing filler selected from carbon black, silica, and combinations thereof.

12. A tire tread comprising the rubber composition of claim 11.

13. A coupled polymer product comprising:
polymer with up to a total of 5 polymer chains bonded directly to a functionalizing compound of formula (III), wherein formula (III) is as follows:

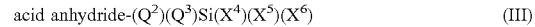

acid anhydride-$(Q^2)(Q^3)Si(X^4)(X^5)(X^6)$      (III)

wherein $Q^2$ comprises at least two methylene groups bonded together and forming a cyclic acid anhydride for formula (III), wherein $Q^3$ is divalent and selected from $C_1$-$C_{12}$ alkylene moieties or aromatic moieties, each X is a leaving group independently selected from halogens and alkoxy of $OR^7$ wherein each $R^7$ is independently selected from $C_1$-$C_{12}$ aliphatic hydrocarbyl, wherein the polymer chains comprise (a) at least one conjugated diene monomer optionally in combination with at least one vinyl aromatic monomer, and (b) at least one vinyl group-functionalized silane compound of formula (I) bonded within the polymer chain via its vinyl group, wherein formula (I) is as follows:

$(H_2C=CH)$-$(A)$-$Si(R^1)(R^2)(R^3)$      (I)

wherein A is divalent and selected from $C_6$-$C_{20}$ aromatic hydrocarbons optionally substituted with an aliphatic alkylene moiety to which the Si is bonded, each of $R^1$, $R^2$, and $R^3$ are independently selected from linear or branched $C_1$-$C_{12}$ hydrocarbyl and —$N(R^4)(R^5)$, with at least one of R¹, R² and R³ selected from -N(R⁴)(R⁵), and wherein each R⁴ and R⁵ are independently selected from aliphatic hydrocarbyl of $C_1$-$C_{12}$ or aromatic hydrocarbyl of $C_6$-$C_{18}$, with R⁴ and R⁵ optionally bonded together into a ring, and le and R² are optionally bonded together into a ring comprising two nitrogen atoms,
  wherein the average number of vinyl group-functionalized aminosilane compound of formula (I) per polymer chain is about 0.1:1 to about 3:1, and
  up to 3 polymer chains are bonded to the Si of each compound of formula (III).

14. The coupled polymer product of claim 13, wherein the formula (I) compound is positioned 50 to 90% from the tail of the polymer chain.

15. The coupled polymer product of claim 13, wherein A is phenylene.

16. The coupled polymer product of claim 13, wherein the functionalizing compound of formula (III) has each of each of X¹, X² and X³ as halogen.

17. The coupled polymer product of claim 13, wherein the functionalizing compound of formula (III) has each of X¹, X² and X³ as OR⁶.

18. The coupled polymer product of claim 13, wherein the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 3-methyl-1,3-pentadiene, 4-methyl-1,3-pentadiene, 2,4-hexadiene, and combinations thereof and
  any aromatic vinyl monomer present in (a) and (c) and is selected from the group consisting of styrene, alphamethyl styrene, p-methyl styrene, o-methyl styrene, p-butyl styrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol.

19. The coupled polymer product of claim 18, wherein functionalizing compound (III) is an alkoxysilylalkylsuccinic acid.

20. A process for preparing the coupled polymer product according to claim 13, the process comprising:
  a. polymerizing the at least one conjugated diene monomer and the at least one vinyl aromatic monomer when present using an anionic initiator to produce polymer chains with a living end;
  b. reacting the living end polymer chains from (a) with the vinyl group-functionalized aminosilane compound having formula (I),
    thereby producing a first intermediary product including polymer chains containing at least one vinyl group-functionalized aminosilane compound bonded to the polymer chain via its vinyl group;
  c. continuing polymerization of the at least one conjugated diene monomer and at least one vinyl aromatic monomer when present from (a) upon the polymer chains from (b),
    thereby producing a second intermediary product including polymer chains containing at least one vinyl group-functionalized aminosilane compound of formula (I) bonded within the polymer chain via its vinyl group, wherein the average number of vinyl group-functionalized aminosilane compound of formula (I) per polymer chain is about 0.1:1 to about 3:1;
  d. functionalizing the second intermediary product from (c) with the functionalizing compound having formula (III), thereby producing a final coupled polymer product including
  i. polymer chain ends functionalized with a compound of formula (III) via its acid anhydride group,
  ii. polymer chain ends functionalized with a compound of formula (III) via the Si of formula (III),
  iii. up to 3 polymer chains bonded to the Si of each compound of formula (III) from (i),
  iv. the polymer chains of the final polymer product of (d) have an average number of vinyl group-functionalized aminosilane compound of formula (I) per polymer chain of about 0.1:1 to about 3:1, and
  v. 20 to 80% by weight of the final polymer product comprises coupled polymer with 2 or more polymer chains bonded directly to each functionalized compound of formula (III).

21. The process of claim 20, wherein the ratio of the vinyl group-functionalized aminosilane of formula (I) to anionic initiator is 0.1:1 to 3:1.

22. The process of claim 20, wherein the anionic initiator used does not include any nitrogen atom.

23. A rubber composition comprising:
  a. 10-100 parts of the coupled polymer product of claim 13;
  b. 0-90 parts of at least one diene monomer-containing polymer selected from the group consisting of natural rubber, polyisoprene, polybutadiene rubber, styrene-butadiene rubber, styrene-butadiene-isoprene rubber, isoprene-butadiene rubber, and combinations thereof; and
  c. 5-200 phr of at least one reinforcing filler selected from carbon black, silica, and combinations thereof.

24. A tire tread comprising the rubber composition of claim 23.

25. A coupled polymer product comprising:
polymer with up to a total of 5 polymer chains bonded directly to a functionalizing compound of formula (III), wherein formula (III) is as follows:

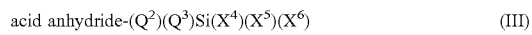

acid anhydride-(Q²)(Q³)Si(X⁴)(X⁵)(X⁶)      (III)

wherein Q² comprises at least two methylene groups bonded together and forming a cyclic acid anhydride for formula (III), wherein Q³ is divalent and selected from $C_1$-$C_{12}$ alkylene moieties or aromatic moieties, each X is a leaving group independently selected from halogens and alkoxy of OR⁷ wherein each R⁷ is independently selected from $C_1$-$C_{12}$ aliphatic hydrocarbyl,
wherein the polymer chains comprise (a) at least one conjugated diene monomer optionally in combination with at least one vinyl aromatic monomer, and (b) at least one vinyl group-functionalized silane compound of formula (I) bonded within the polymer chain via its vinyl group, wherein formula (I) is as follows:

(H₂C=CH)-(A)-Si(R¹)(R²)(R³)      (I)

wherein A is divalent and selected from C6-C20 aromatic hydrocarbons optionally substituted with an aliphatic alkylene moiety to which the Si is bonded, each of R¹, R², and R³ are independently selected from linear or branched $C_1$-$C_{12}$ hydrocarbyl and —N(R⁴)(R⁵), with at least one of R¹, R² and R³ selected from —N(R⁴)(R⁵), and wherein each R⁴ and R⁵ are independently selected from aliphatic hydrocarbyl of $C_1$-$C_{12}$ or aromatic hydrocarbyl of $C_6$-$C_{18}$, with R⁴ and R⁵ optionally bonded together into a ring, and $R^1$ and $R^2$ are optionally bonded together into a ring comprising two nitrogen atoms,
wherein the average number of vinyl group-functionalized aminosilane compound of formula (I) per polymer chain is about 0.1:1 to about 3:1, and
up to 3 polymer chains are bonded to the Si of each compound of formula (III), and wherein the coupled polymer product has a head where an initiator residue lacking any nitrogen atom resides.

* * * * *